(12) United States Patent
Jackey et al.

(10) Patent No.: US 8,780,114 B1
(45) Date of Patent: Jul. 15, 2014

(54) INTERACTIVE MEMORY MAP

(75) Inventors: Robyn Arthur Jackey, Livonia, MI (US); Arvind Suresh Hosagrahara, Novi, MI (US)

(73) Assignee: The MathWorks, Inc., Natick, MA (US)

( * ) Notice: Subject to any disclaimer, the term of this patent is extended or adjusted under 35 U.S.C. 154(b) by 1025 days.

(21) Appl. No.: 12/550,686

(22) Filed: Aug. 31, 2009

(51) Int. Cl.
  *G06T 11/20* (2006.01)
(52) U.S. Cl.
  USPC ........... 345/440; 345/672; 345/543; 715/769; 715/700
(58) Field of Classification Search
  CPC . G06F 12/00; G06F 12/0207; G06F 12/0223; G06F 3/04846; G06F 3/0486; G06T 1/60; G06T 11/40; G06T 11/206
  USPC .................. 345/543, 440, 672; 715/769, 700
  See application file for complete search history.

(56) References Cited

U.S. PATENT DOCUMENTS

| | | | |
|---|---|---|---|
| 5,408,650 A * | 4/1995 | Arsenault | 717/124 |
| 6,351,845 B1 * | 2/2002 | Hinker et al. | 717/128 |
| 6,611,952 B1 * | 8/2003 | Prakash et al. | 716/102 |
| 6,968,341 B2 * | 11/2005 | Hand et al. | 702/186 |
| 7,484,065 B2 * | 1/2009 | Pomaranski et al. | 711/170 |
| 7,680,988 B1 * | 3/2010 | Nickolls et al. | 711/149 |
| 8,566,804 B1 * | 10/2013 | Carrick et al. | 717/135 |
| 2003/0172055 A1 * | 9/2003 | Prakash et al. | 707/1 |
| 2005/0278059 A1 * | 12/2005 | Osborn et al. | 700/181 |
| 2008/0301717 A1 * | 12/2008 | Chilimbi et al. | 719/329 |

* cited by examiner

*Primary Examiner* — Michelle L Sams
(74) *Attorney, Agent, or Firm* — Harrity & Harrity, LLP

(57) ABSTRACT

An embodiment can include an interactive memory map that includes a graphical representation of a region of memory used by a program. The memory map may dynamically update as the program executes and may provide a user with indicators that identify how the program interacts with the memory. The indicators may identify memory locations that are being written by the program and/or memory locations that are being read by the program while the program executes. The memory map may assist a user in understanding how the executing program interacts with memory. The interactive memory map may further allow the user to manipulate how information is stored in the memory by allowing the user to select, add, remove, modify, move, etc., program information stored in the memory.

31 Claims, 17 Drawing Sheets

INTERACTIVE MEMORY MAP

BRIEF DESCRIPTION OF THE DRAWINGS

The accompanying drawings, which are incorporated in and constitute a part of this specification, illustrate one or more embodiments of the invention and, together with the description, explain the invention. In the drawings.

DETAILED DESCRIPTION

Figure 1:
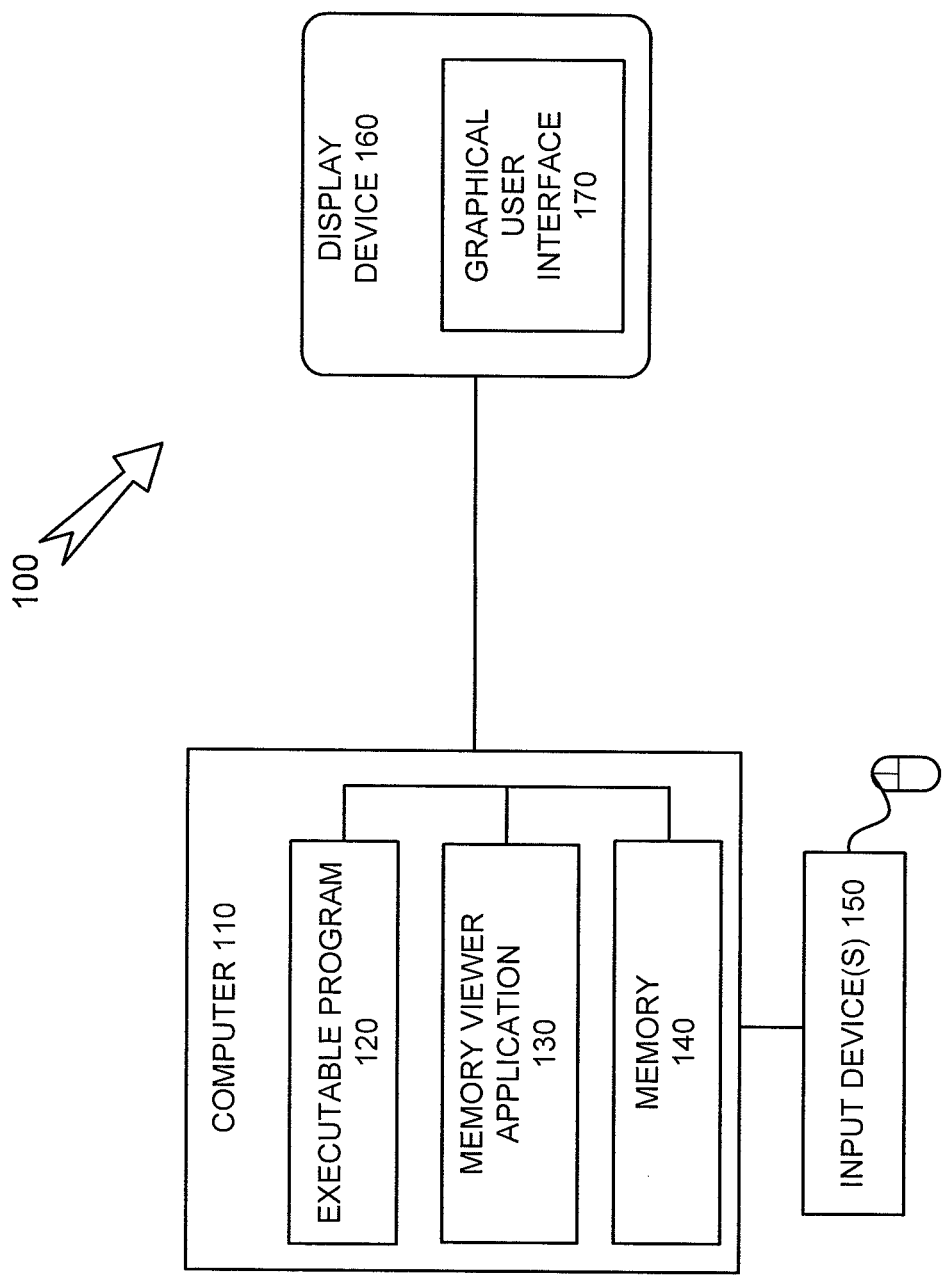
FIG. 1 illustrates an exemplary system for interacting with a memory.

The following detailed description of implementations consistent with principles of the invention refers to the accompanying drawings. The same reference numbers in different drawings may identify the same or similar elements. Also, the following detailed description does not limit the invention. Instead, the scope of the invention is defined by the appended claims and their equivalents.

Overview

An exemplary embodiment provides an interactive memory map to a user while a program executes. The memory map is provided to the user via a memory map viewer that includes a graphical user interface (GUI). For example, a user may be presented with a two dimensional image that displays memory registers that are written to or read from by the executing program. The image may include address information for the registers so that the user can determine exactly where the information is stored in the memory.

By way of example, a user may be executing a model, such as a graphical model, and the model may include a block that reads a data value from a memory location, processes the data value, and then writes a result to another memory location. The user may see from where in the memory the data value is read when the model executes by, for example, having certain location identifiers in the memory map image change color during the data read operation. The user may then see where the result is stored in the memory by, for example, having other location identifiers in the memory map flash or change color when the result is written to memory.

The memory map may allow the user to determine such things as whether a memory location is accessed out of sequence (e.g., by having new data written into a memory location before older data is read from the memory location), whether atomic data access or data integrity is violated (e.g., by having new data written into a memory location while older data is read from the memory location), whether a region of memory is segmented (i.e., where data is not stored in contiguous locations in the region of memory), whether a shared pool of memory is being correctly accessed by multiple processing devices, whether a memory transaction proceeds correctly, whether memory registers include packing, etc.

Embodiments of an interactive memory map may further allow users to interact with memory locations. For example, a user may be designing a model and may need to allocate storage for components in the model (e.g., executable blocks used in the model). The user may select a block from the model and may drop the block onto an image of the memory map at a determined location in the map. When the user drops the block onto the memory map, the appropriate amount of memory for the block may be identified as being allocated at the determined location. The interactive memory map may allow the user to intuitively configure memory usage for elements in the model by allowing the user to drag and drop blocks into the memory map at locations determined by the user and/or by allowing the user to rearrange entries stored in memory. Once the user allocates memory for the model blocks, the user can view how the model components interact with the memory (e.g., interactions that write data to and/or read data from the memory).

Exemplary System

FIG. 1 illustrates an exemplary system 100 for practicing an embodiment. For example, system 100 may be used to launch a memory viewer application that provides a user with an interactive memory map for displaying information about a memory. The user may use the memory map to investigate how an application uses the memory while the application executes.

In the embodiment of FIG. 1, system 100 may include computer 110, input device 150 and display device 160. The system in FIG. 1 is illustrative and other embodiments of system 100 can include fewer devices, more devices, and/or devices in configurations that differ from the configuration of FIG. 1.

Computer 110 may include a device that performs processing operations, display operations, communication operations, etc. For example, computer 110 may include logic, such as one or more processing or storage devices, that can be used to perform and/or support processing activities on behalf of a user. Embodiments of computer 110 may include a desktop computer, a laptop computer, a netbook computer, a client, a server, a mainframe, a personal digital assistant (PDA), a web-enabled cellular telephone, a smart phone, smart sensor/actuator, or another computation or communication device that executes instructions to perform one or more activities and/or generate one or more results.

Computer 110 may further perform communication operations by sending data to or receiving data from another device, such as a server that is remote with respect to computer 110. Data may refer to any type of machine-readable information having substantially any format that may be adapted for use in one or more networks and/or with one or more devices. Data may include digital information or analog information. Data may further be packetized and/or non-packetized.

Computer 110 can further provide a computing environment that allows users to perform tasks related to disciplines, such as, but not limited to, mathematics, science, engineering, medicine, business, etc., more efficiently than if the tasks were performed in another type of computing environment, such as an environment that required the user to develop code in a conventional programming language, such as C++, C, Fortran, Pascal, etc.

The computing environment may provide mathematical functions and/or graphical tools (e.g., for creating diagrams, plots, surfaces, images, volumetric representations, etc.). In one implementation, the computing environment may provide these functions and/or tools using toolboxes (e.g., toolboxes for signal processing, image processing, data plotting, parallel processing, optimization, etc.). In another implementation, the computing environment may provide these functions as block sets (e.g., a control system block set). In still another implementation, the computing environment may provide these functions in another way, such as via a library, etc.

Computer 110 can include an executable program 120, a memory viewer application 130 and a memory 140. Program 120 may include code that when executed performs one or more operations when the code is executed. In an embodiment, program 120 may represent a model of a physical system. When program 120 executes, the model may perform operations to simulate the physical system. Program 120 may interact with memory 140 when program 120 executes.

Memory viewer application 130 (hereinafter MVA 130) may include code that allows a user to graphically visualize interactions between program 120 and memory 140. For example, in an embodiment, the user may execute program 120 to simulate a controller for a system. Program 120 may write information (e.g., signals, parameters, etc.) to and may read information from memory 140 when program 120 is executing. MVA 130 may display a graphical representation of memory 140 to the user and may modify the graphical representation as program 120 executes to show the user how program 120 interacts with memory 140 during program execution. By way of example, memory locations being written to may be shown in a first color when the memory locations receive information from program 120, and memory locations being read by program 120 may be shown in a second color when the memory locations are accessed by program 120.

Embodiments of MVA 130 can include instrumentation for helping a user visualize and understand interactions between program 120 and memory 140. For example, embodiments of MVA 130 can be used to visualize memory interactions on a variety of architecture types, such as, but not limited to, a single processor having several memory types; multiple processors having communications between cores on the processors and/or communications between memory locations on the processor chip (e.g., cache or core registers); two or more processors sharing a common pool of memory; a system on a chip (e.g., a microprocessor on a field programmable gate array (FPGA)); a microprocessor, digital signal processor, peripherals, and network on a chip); or a system in package. MVA 130 can further display graphical layouts of memory 140 using two dimensional images, three dimensional images, or using images having more than three dimensions without departing from the spirit of the invention.

Memory 140 may include logic that stores information (e.g., information used by a central processing unit, embedded processor, etc.). Memory 140 can include a single type of storage or may include two or more different types of storage. For example, memory 140 can include random access memory (RAM), read only memory (ROM), flash memory, stacks, heaps, registers, first-in-first-out queues, mailboxes, magnetic hard disks, solid-state disks, optical disks, compact disks, etc. Memory 140 can be local to computer 110 (e.g., installed on a mother board in computer 110) or remote with respect to computer 110 (e.g., memory connected to computer 110 via a network connection).

Input device 150 may include logic for entering information to computer 110. Input device 150 may include a keyboard, a mouse, a pen, a touchpad, an accelerometer, a microphone, voice recognition device, camera, neural interface, biometric mechanisms, haptic device, etc.

Display device 160 may include logic that displays information to a user. Embodiments of display device 160 can include a cathode ray tube (CRT), plasma display device, light emitting diode (LED) display device, liquid crystal display (LCD) device, touch sensitive display, video projector, etc. In an embodiment, display device 160 can include graphical user interface (GUI) 170 for displaying information to a user. GUI 170 can include GUI elements (e.g., widgets, windows, frames, panes, etc.), text, tables, images, etc.

Exemplary Architecture

Figure 2:
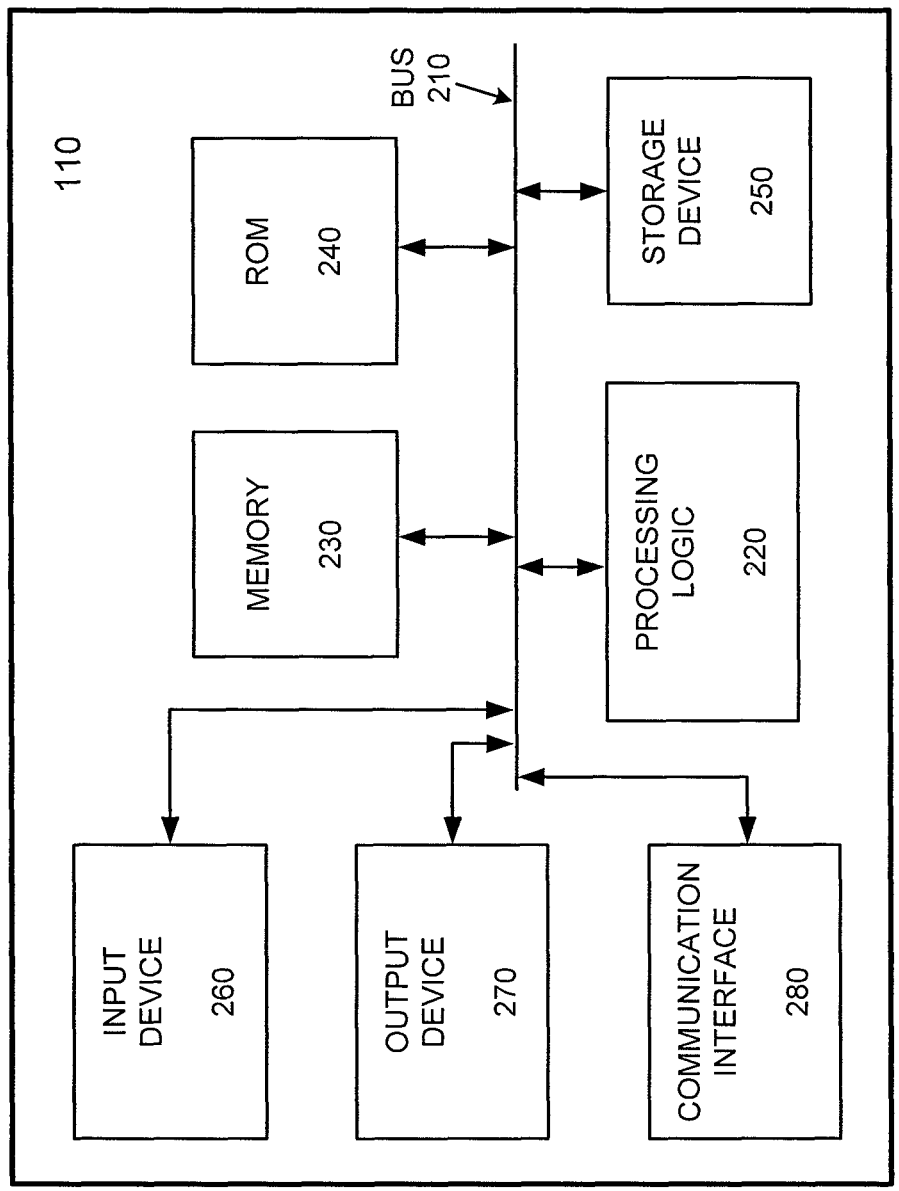
FIG. 2 illustrates an exemplary architecture for implementing the computer of FIG. 1.

FIG. 2 illustrates an exemplary computer architecture that can be used to implement computer 110 of FIG. 1. FIG. 2 is an exemplary diagram of an entity corresponding to computer 110. As illustrated, the entity may include a bus 210, processing logic 220, a main memory 230, a read-only memory (ROM) 240, a storage device 250, an input device 260, an output device 270, and/or a communication interface 280. Bus 210 may include a path that permits communication among the components of the entity.

Processing logic 220 may include a processor, microprocessor, or other types of processing logic that may interpret and execute instructions. In one implementation, processing logic 220 may include a single core processor or a multi-core processor. In another implementation, processing logic 220 may include a single processing device or a group of processing devices, such as a processor cluster or computing grid. In still another implementation, processing logic 220 may include multiple processors that may be local or remote with respect each other, and may use one or more processes, tasks, threads, etc., while processing.

Main memory 230 may include a random access memory (RAM) or another type of dynamic storage device that may store information and instructions for execution by processing logic 220. ROM 240 may include a ROM device or another type of static storage device that may store static information and/or instructions for use by processing logic 220. Storage device 250 may include a magnetic, solid state and/or optical recording medium and its corresponding drive, or another type of static storage device that may store static information and/or instructions for use by processing logic 220. In an embodiment, memory 140 can be main memory 230 and/or storage device 250.

Input device 260 may include logic that permits an operator to input information to the entity. In an embodiment, input device 260 can be input device 150. Output device 270 may include a mechanism that outputs information to the operator, including a display, a printer, a speaker, etc. Embodiments of output device 270 can include display device 160. Communication interface 280 may include any transceiver-like logic that enables the entity to communicate with other devices and/or systems. For example, communication interface 280 may include mechanisms for communicating with another device or system via a network.

The entity depicted in FIG. 2 may perform certain operations in response to processing logic 220 executing software instructions contained in a computer-readable medium, such as main memory 230. A computer-readable medium may be defined as a physical or logical memory device. The software instructions may be read into main memory 230 from another computer-readable storage medium, such as storage device 250, or from another device via communication interface 280. The software instructions contained in main memory 230 may cause processing logic 220 to perform processes described herein when the software instructions are executed on processing logic. Alternatively, hardwired circuitry may be used in place of or in combination with software instructions to implement processes described herein. Thus, implementations described herein are not limited to any specific combination of hardware circuitry and software.

Although FIG. 2 shows exemplary components of the entity, in other implementations, the entity may contain fewer, different, or additional components than depicted in FIG. 2. In still other implementations, one or more components of the entity may perform one or more tasks described as being performed by one or more other components of the entity.

Exemplary Memory Maps

Figure 3:
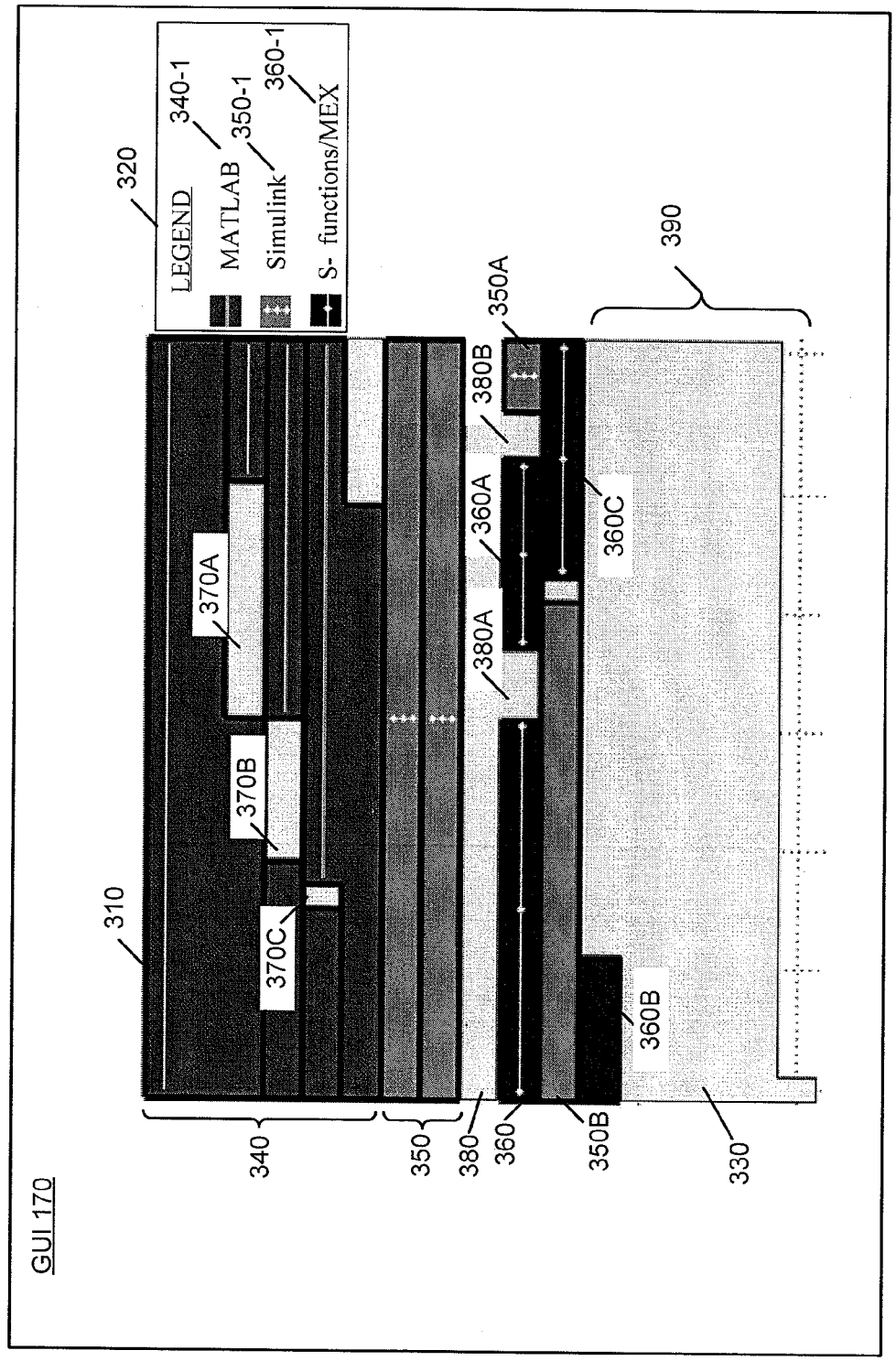
FIG. 3 illustrates an exemplary graphical user interface for viewing an interactive memory map.

FIG. 3 illustrates an exemplary GUI 170 for viewing an interactive memory map. GUI 170 may include memory map 310 that displays a map identifying storage usage. For example, memory map 310 may display system memory usage in an exemplary embodiment. Memory map 310 may use graphical representations, such as blocks, to represent portions of the system memory. For example, memory map 310 may include blocks 340, 350, 350A, 350B, 360, and 360A-C to show memory locations in use. In contrast, blocks 330, 370A-C, 380, and 380A-B may be used to show available memory locations (e.g., memory locations that are not used by the executing program).

In FIG. 3, a size of a block, such as block 340 or block 370A, may represent an amount of memory used or an amount of available memory. For example, an amount of memory used by block 340 may be larger than an amount of memory used by block 350. The size of blocks displayed in memory map 310 may depend on data types, dimensions of signals, dimensions of parameters, etc. In an embodiment, memory map 310 may continuously or periodically update during execution of one or more programs that interact with the memory represented by memory map 310.

Embodiments of memory map 310 may indicate types of information stored in a memory using identifiers contained in legend 320. For example, identifier 340-1 may indicate that information in block 340 is associated with a MATLAB programming language, identifier 350-1 may indicate that information in block 350 and 350B are associated with a Simulink application, and identifier 360-1 may indicate that block 360, 360A-360C are associated with S-functions or MATLAB executable (MEX) files.

Memory map 310 can also allow a user to determine whether stored information is in contiguous memory locations. For example, stored information in block 340 for the MATLAB programming language includes some empty blocks of memory, namely blocks 370A, B, and C. From memory map 310, a user can also determine that information for Simulink is stored in discontiguous locations because block 350 is separated from blocks 350A and 350B by empty memory locations, such as block 380, as well as by other types of stored information, such as S-function/MEX file information stored in blocks 360 and 360A.

Embodiments of memory map 310 allow a user to quickly identify contiguous or discontiguous memory locations, the relative size of occupied or empty memory locations, an available amount of memory, the age of data stored in memory, number of accesses, frequency of read/write to a location, etc. For example, the age of data can be shown using faded colors, where the degree of fading represents the age of the data.

Memory map 310 can be interactive and may allow a user to select, move, delete, insert, modify, etc., displayed information. For example, memory 140 may store a variable and the variable may be displayed in memory map 310, e.g., as block 350. A user may select the variable by clicking over block 350 using a mouse. The selecting may allow the user to change a data type for the variable from a single to a double, to a fixed point type, to a structured data type (e.g., a cell array, struct, or record), etc.

Selecting one or more blocks, such as block 350, 350A and 350B may allow a user to move the blocks into a contiguous block of unused memory, such as block 330. The moved blocks may be stored in contiguous locations once the user completes the move operation. Memory map 310 may further display information that is related to other information. For example, memory map 310 may store information that is extracted from a symbol table that is stored in a memory. Embodiments of memory map 310 may also store information about data that is changed in an algorithmic manner, e.g., data changed from row major to column major, changes to the endianness of data stored in a memory, etc.

Figure 4:
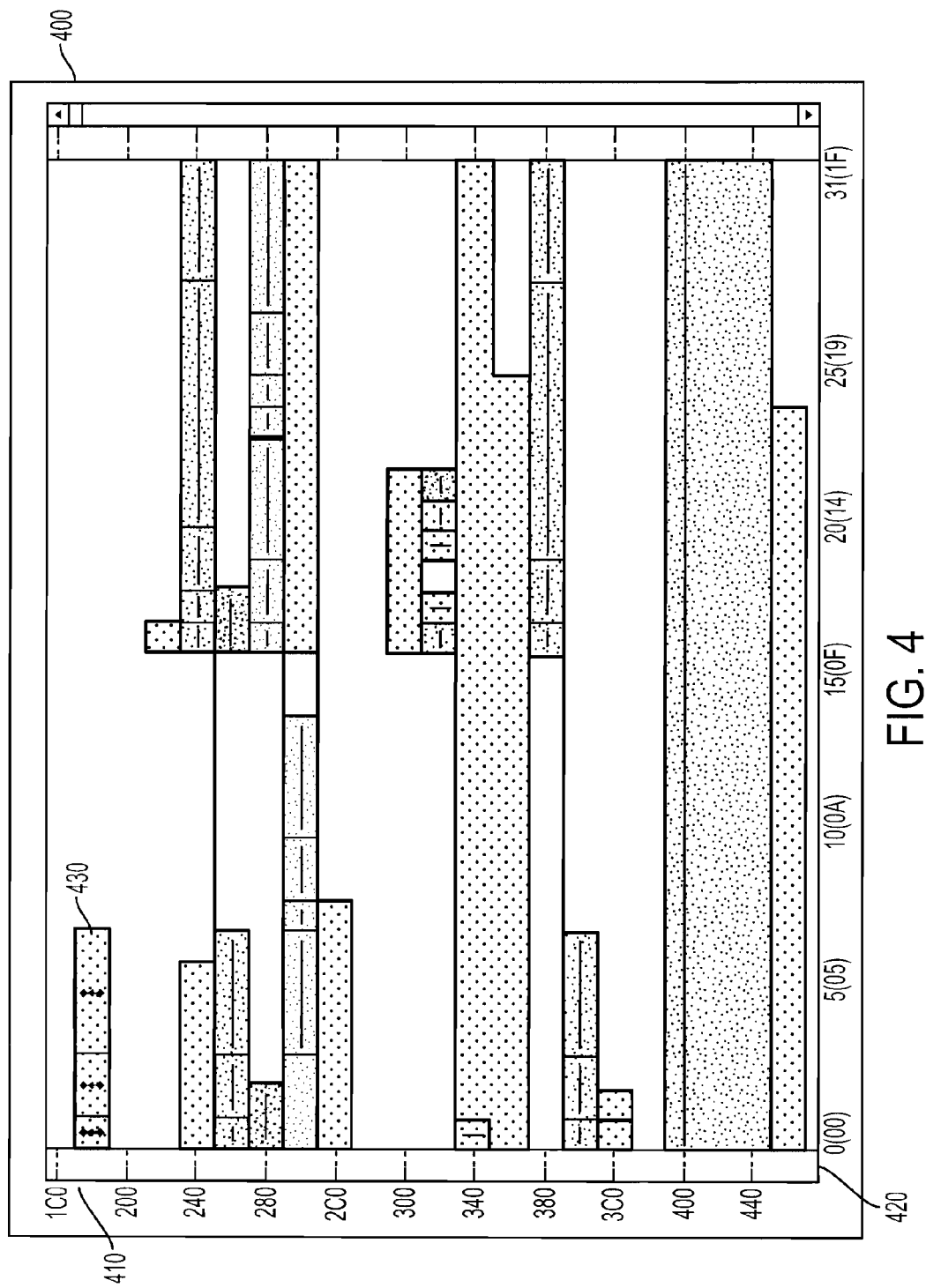
FIG. 4 illustrates an exemplary interactive memory map that includes axes.

Embodiments of memory maps can be modified without departing from the spirit of the invention. For example, referring to FIG. 4, a memory map 400 may include axes 410 and 420 that identify a range of memory addresses (axis 410) and/or sizes of stored information (axis 420). Memory map 400 may use display techniques, such as shading, patterns, colors, fonts, etc., to indicate different types and/or sizes of information stored in memory.

Figure 5:
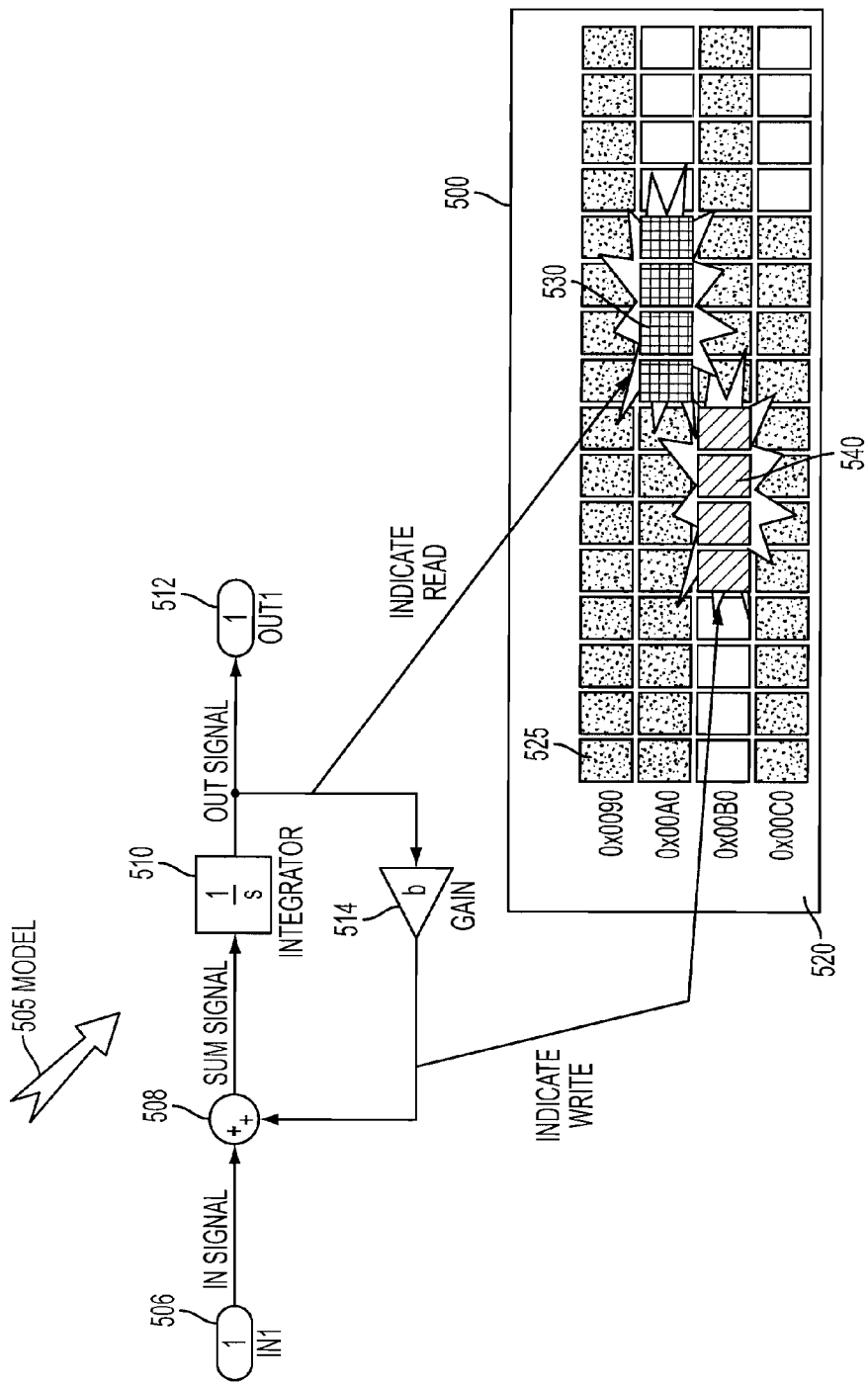
FIG. 5 illustrates an exemplary model that includes information stored in an interactive memory map.

FIG. 5 illustrates an exemplary model that interacts with a memory that is represented in an interactive memory map. Model 505 may include elements, such as blocks, signals, etc., that can be used to model a system. For example, model 505 can include an in port 506 that provides a signal (In Signal) to other components in model 505, such as summation block (sum block) 508. Sum block 508 can receive two signals and can add the two signals together to produce an output, such as Sum Signal in model 505.

Sum block 508 may provide the Sum Signal to a connected component in model 505, such as integrator block 510. Integrator 510 may receive an input signal and may integrate the signal to produce an output, such as Out Signal. Integrator 510 can provide the Out Signal to an out port 512 which may allow the Out Signal to be stored. Integrator 510 may also provide the Out Signal to another block in model 505, such as gain block 514. Gain block 514 may receive a signal and may amplify the signal by a gain value to produce an output. In model 505, the output of gain block 514 may be provided to sum block 508.

Model 505 may be an executable model that can be used to simulate a system. When model 505 executes, information may be written to a memory, such as memory 140, and/or may be read from the memory. For example, model 505 may read information from a memory when gain block 514 is receiving an input signal and model 505 may write information to the memory when gain block 514 produces an output signal.

Still referring to FIG. 5, interactions between model 505 and memory 140 may be displayed via memory map 500. In an embodiment, memory map 500 may only show a portion of memory 140 used by model 505 when model 505 is executing. Memory map 500 may include a memory address range 520 that may provide a user with identifiers for memory addresses used by model 505. Memory map 500 may show memory locations using graphical representations, such as squares, rectangles, etc., where each representation may identify a certain number of bits, bytes, etc. For example, memory map 500 may use shaded rectangles 525 to represent a byte of information in memory 140. Memory map 500 may further represent information being read from memory using rectangles that are identified with a cross-hatched pattern 530 and may indicate information being written to memory using rectangles that are identified with a diagonal line pattern 540.

In an embodiment of memory map 500, rectangles may be temporarily indicated using a cross-hatched pattern 530 or a diagonal line pattern 540 when respective memory addresses are actually being written to or read from. The rectangles may also be temporarily indicated for a specific duration or context related to these read and write events. This allows memory map 500 to provide a user with substantially real-time information about interactions between model 505 and memory 140 as model 505 executes.

Embodiments of memory map 500 may also be used during model debugging activities to help a user debug model 505. For example, a user may use memory map 500 to help identify and trap issues such as stack overruns. The user may also use memory map 500 for identifying portions of an algorithm responsible for the stack overruns. For example, a user may launch a debugging application that can be used for debugging model 505. The user may step through the execution of model 505 and may pause when gain block 514 reads its input values, multiplies the input values by a gain value 'b' and writes to the output signal of gain block 514. Memory map 500 may temporarily identify memory portions being read (e.g., by flashing cross-hatched blocks 530 and/or by flashing diagonally-hatched blocks 540). Embodiments of memory map 500 may dynamically refresh to show changes in memory locations being read from or written to as model 505 continues to execute.

Memory map 500 may also support the use of breakpoints to facilitate debugging code that interacts with storage. For example, a user may select a memory location and may associate a break point with the location. When the memory location is accessed (e.g., written to or read from) execution may be halted. Embodiments may also allow users to specify conditional expressions for breakpoints (e.g., AND, OR, EQUALS, etc.). Embodiments may still further allow users to indicate whether execution should stop immediately upon a certain condition or whether execution can continue until other events, conditions, time intervals, etc., have occurred or passed.

Figure 6:
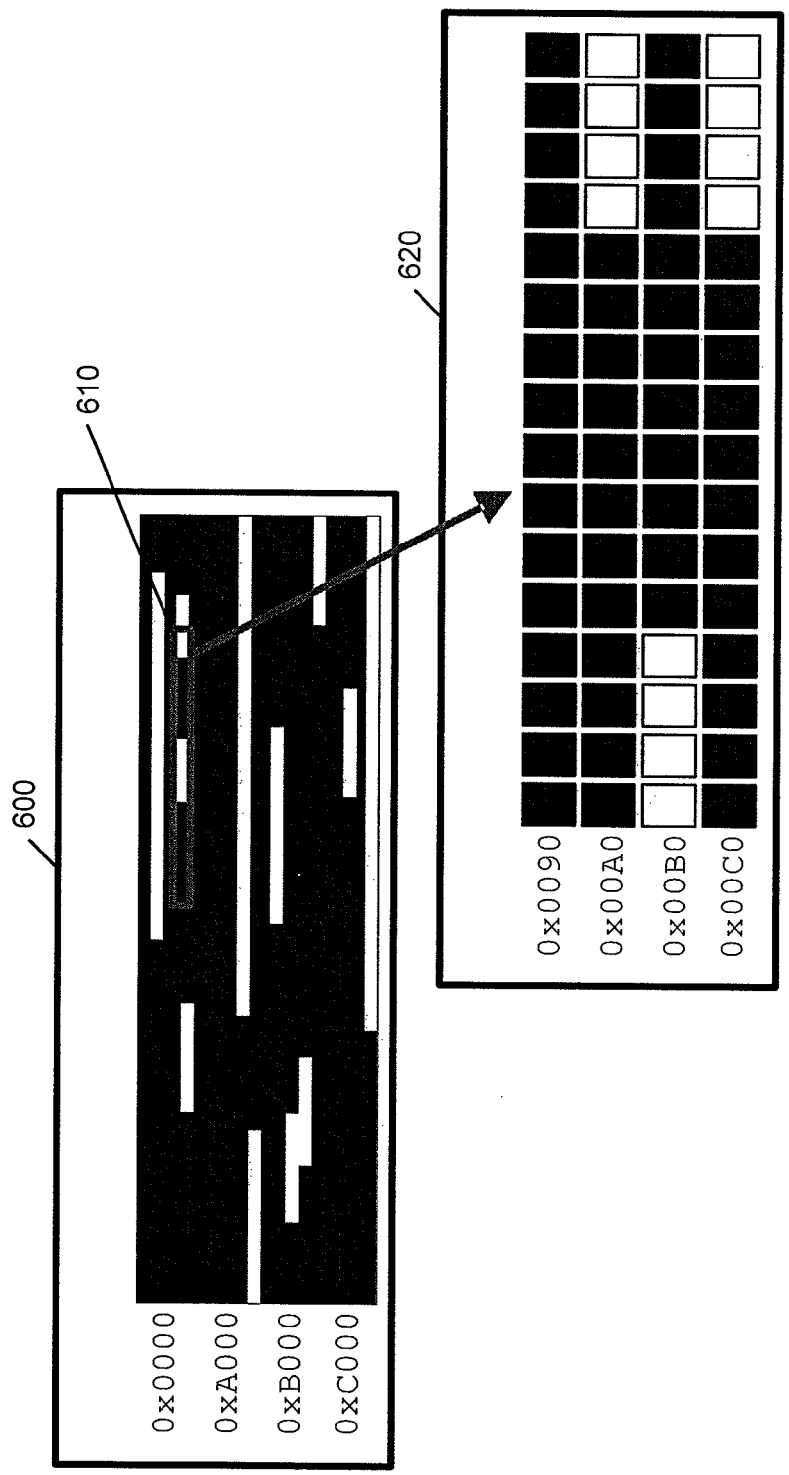
FIG. 6 illustrates an exemplary embodiment that can provide a zoom feature for viewing a portion of an interactive memory map.

Embodiments of memory maps can be used to select regions of memory for further evaluation. For example and referring to FIG. 6, a user may be able to select a region of physical memory using a pointing device. The user may view the selected region in a separate display area. In FIG. 6, a first display region 600 may include a memory map of physical memory used to store information associated with a model, such as model 505. A user may use a mouse to select a region of memory 610. The selected region of memory 610 may be defined using a border and memory locations within the border may be displayed to the user in a second display region 620.

In the embodiment of FIG. 6, second display region 620 may act to provide a zoom capability for the user since a small region of memory in the first display region 600 is expanded to fill the second display region 620. Second display region 620 may include address identifiers to help the user identify specific memory locations shown in second display region 620. Embodiments of the invention may allow a user to dynamically adjust the size of zoomed-in or zoomed-out regions of memory and/or to dynamically adjust ranges of memory addresses displayed in a memory map during execution of a model. The zoomed-in regions may dynamically change during execution of a model to display a region of memory around a memory location when the memory location is read or written Embodiments of memory maps can be used to detect memory access conflicts in an executing program. For example and referring to FIG. 7, a multitasking system may be prone to priority conflicts or inversions when one task attempts to perform an operation unexpectedly. When these multitasking systems are modeled, the models may also be prone to priority conflicts or inversions.

Figure 7:
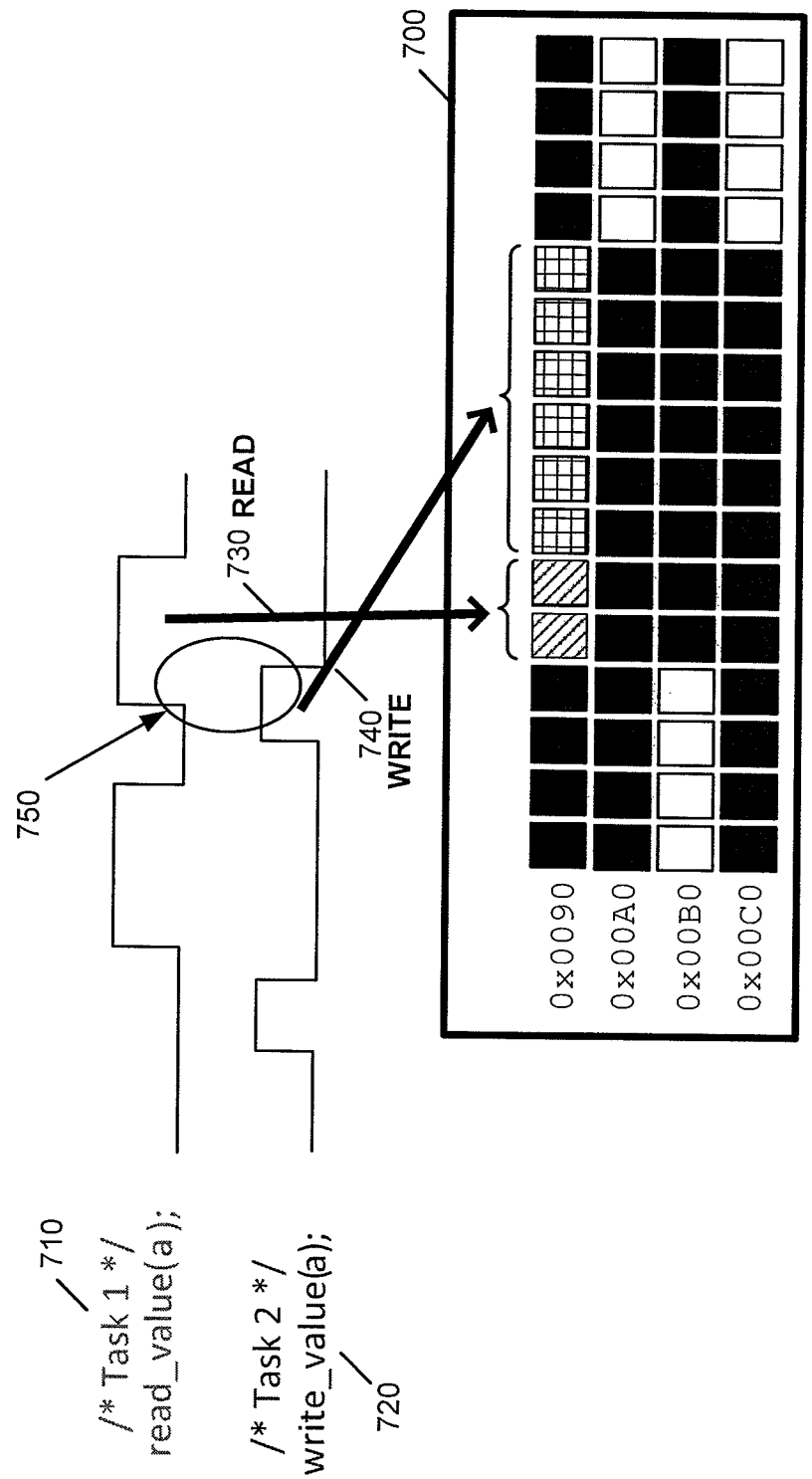
FIG. 7 illustrates an exemplary embodiment that can be used to identify read/write conflicts in a physical memory.

In FIG. 7, there are two tasks that execute namely task-1 710 and task-2 720. Task-1 710 may be configured to read from memory 140 and task-2 720 may be configured to write to memory 140. Proper operation of a model representing a multi-tasking system may require that task-2 720 write information (action 740) to memory 140 before task-1 710 reads information (action 730) from memory. In an implementation of the model, task-1 710 may read information (730) before task-2 720 writes information (740) to memory 140.

A user may wish to identify why the model is not operating properly and may step through execution of the model using a debugger. The user may initiate the debugger and a memory map 700 may be displayed via display device 160. In an embodiment, timing diagrams showing task-1 710 and task-2 720 may also be displayed. In FIG. 7, memory map 700 may include memory addresses used by the model when the model executes. The user may step through execution of the model using the debugger and the user may simultaneously observe timing diagrams for task-1 710 change and task-2 720 and locations in memory map 700 change as various parts of a model are executed in the debugger.

For example, the user may see a conflict identifier 750 that indicates a problem between the timing of task-1 710 and task-2 720. In FIG. 7, the conflict may indicate that task-2 720 is writing information to memory via action 740 after task-1 710 is reading information from the memory via action 730. Memory map 700 may graphically show memory locations being written to by task-2 720 and memory locations being read from by task-1 710 when conflict identifier 750 is displayed. Memory map 700 may help the user determine that timing between task-1 710 and task-2 720 needs to be adjusted so that information is written to memory before information is read from memory. Memory map 700 can use shading, colors, patterns, and other display techniques to indicate potential runtime conflicts and/or to indicate conflicts that have occurred.

Figure 8:
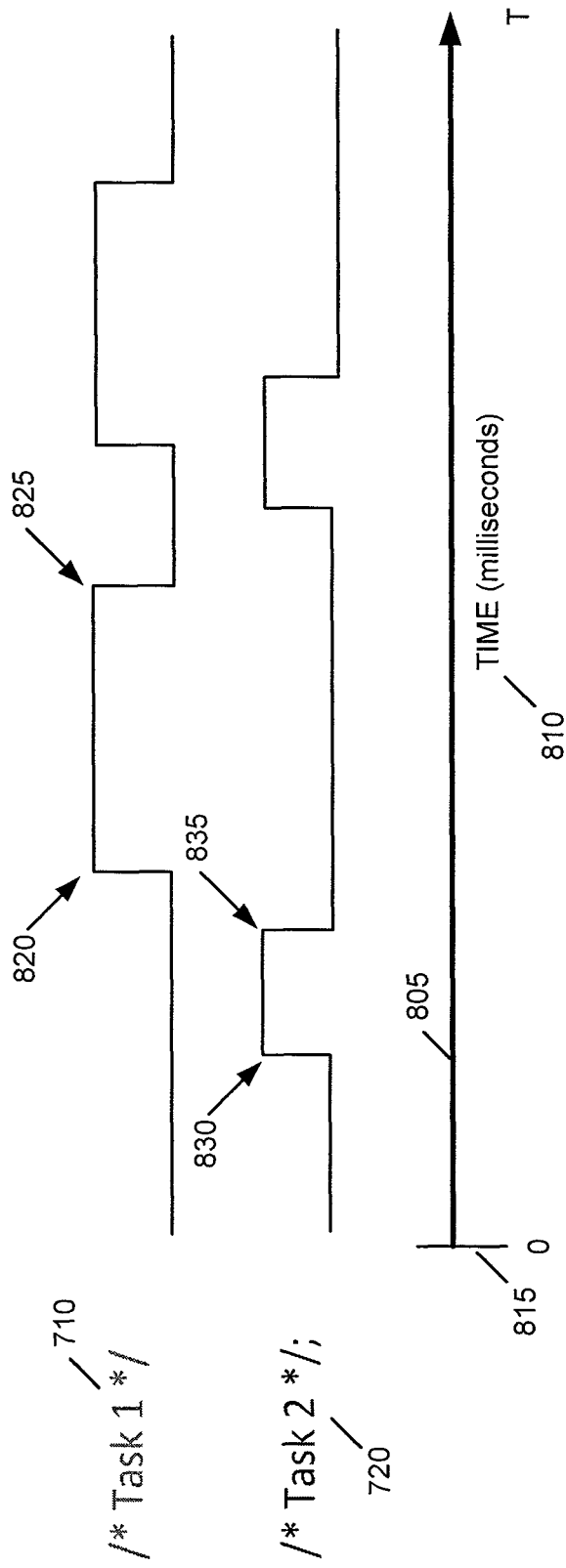
FIG. 8 illustrates an exemplary embodiment that can be used to diagnose task scheduling issues in a system.

Embodiments of a MVA 130 can be adapted to display timing information in a variety of formats. For example, referring to FIG. 8, timing information for task-1 710 and task-2 720, of FIG. 7, can be displayed in a user interface that includes only plots of timing information for executing tasks. In an embodiment, execution time steps can be displayed along with a time axis 805. Time axis 805 can include a label 810, such as "time", and units, such as milliseconds. Time axis 805 can also include other types of information, such as a starting time 815 or a stopping time (not shown). The embodiment of FIG. 8 can further include information that identifies a start time 820 and a stop time 825 for task-1 710 and a start time 830 and a stop time 835 for task-2 720. The embodiment of FIG. 8 may also include a task scheduler and/or a plot generator for helping a user diagnose and correct task scheduling issues. Embodiments, such as the one illustrated in FIG. 8, may use a message, or sequence, chart to represent interactions with storage without departing from the spirit of the invention.

Figure 9A:
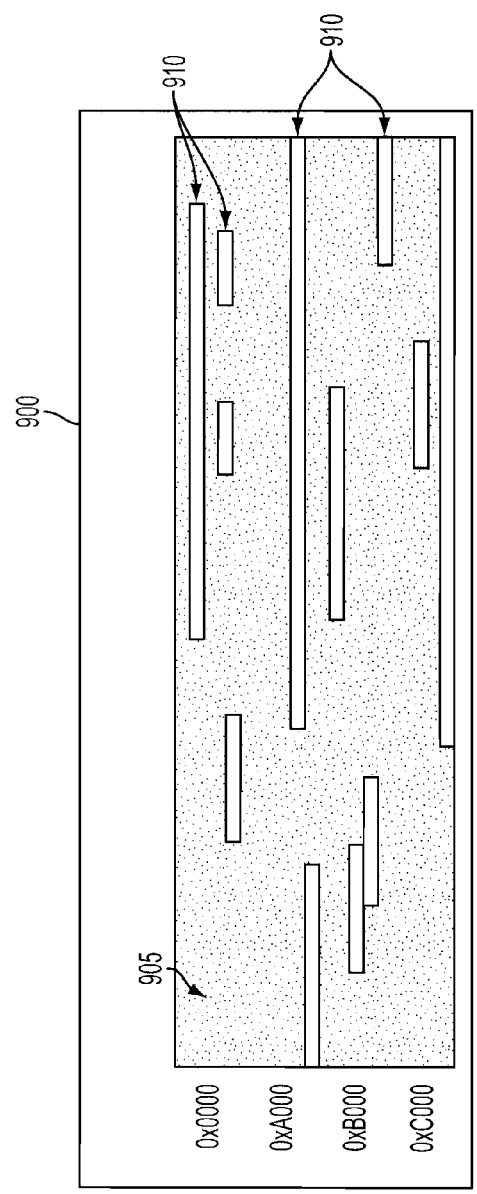
FIG. 9A illustrates an exemplary interactive memory map that can be used to identify unused memory segments.

In some situations memory may be wasted because an application does not store information in contiguous memory locations. For example, referring to FIG. 9A, an interactive memory map 900 may show used memory locations 905 via dark shading, a first color, a first pattern, etc., and may show unused memory locations 910 via lighter shading, a second color, a second pattern, etc. In FIG. 9A, unused memory locations 910 are interspersed with used memory locations 905. In some implementations, these relatively small unused memory locations may not be readily useable because of their small size and/or distribution among used memory locations. As a result, a larger amount of memory may be needed by an application than would be required if the application stored information in contiguous memory locations (i.e., in memory locations that do not include unused memory locations 910).

Figure 9B:
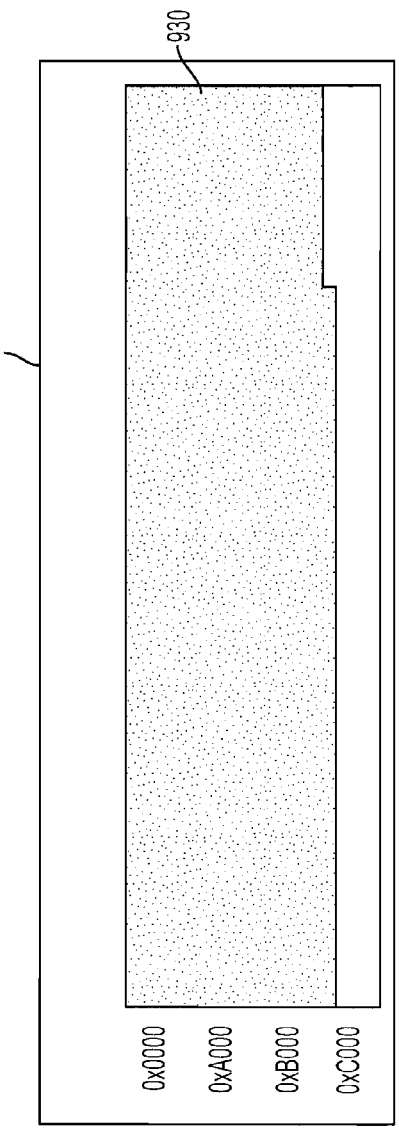
FIG. 9B illustrates the interactive memory map of FIG. 9A when unused memory segments have been removed from a memory.

The embodiment of FIG. 9A may allow a user to graphically reassign (e.g., drag and drop) used memory locations 905 and/or unused memory locations 910 to desired locations. For example, a user may drag and drop unused locations 910 from the locations shown in FIG. 9A to locations at the bottom of the memory map 920 of FIG. 9B. MVA 130 may automatically remap used memory locations 905 once unused memory locations 910 are relocated so that all used memory locations in memory map 920 are contiguous with respect to each other. Remapped memory locations may occupy less memory resources than unmapped memory locations that include segmented regions of used memory and unused memory.

Embodiments can allow a user to specify a starting and/or an ending address for remapping memory locations, can allow a user to drag and drop used and/or unused memory locations when remapping memory locations, can programmatically remap memory locations without requiring that a user specify a start/stop address or manually remap memory locations, etc.

Figure 10:
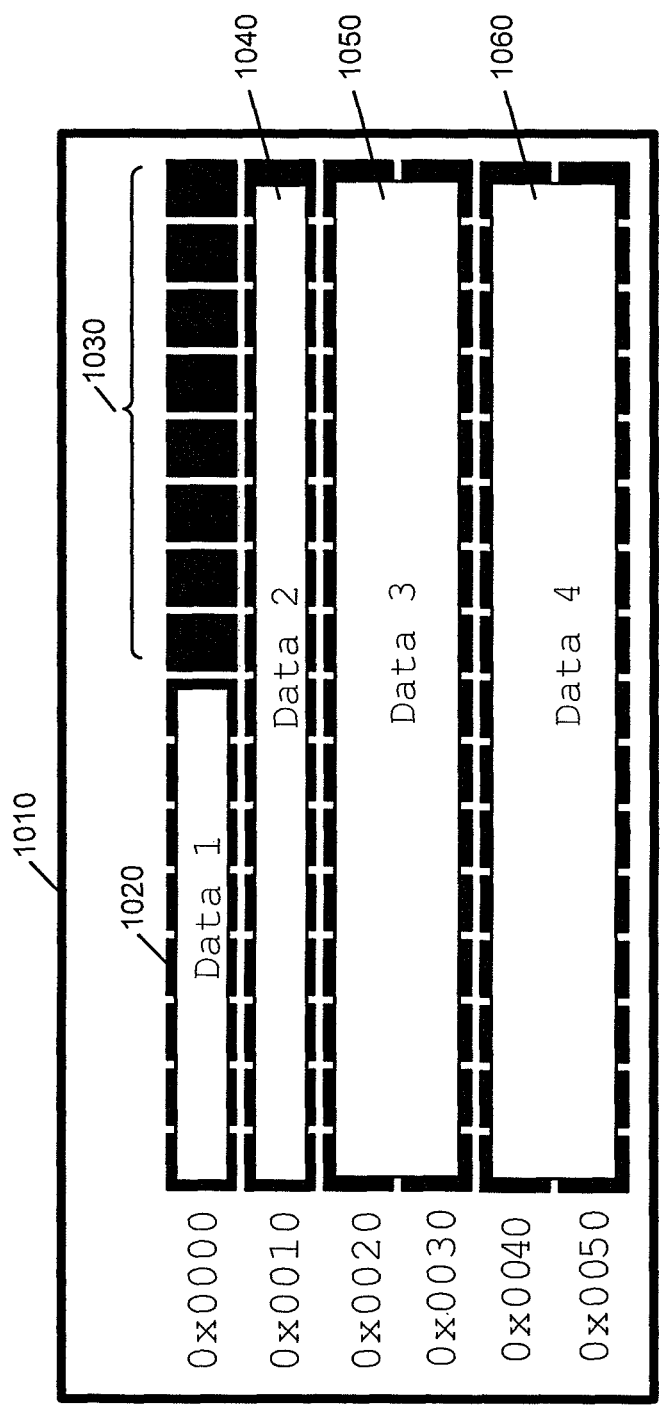
FIG. 10 illustrates an exemplary interactive memory map that can be used to identify data and packing in a memory.

Embodiments of MVA 130 and displayed memory maps can be used with memories that use data structure padding. Referring to FIG. 10, a memory may store data using data structure padding. Memory map 1010 may be used to display information about how padded data is stored in the memory, for example for variables of a structured data type (e.g., a cell array, struct, or record). For example, data-1 1020 may include packing 1030 to cause data-1 1020 to use a certain amount of memory. This amount of memory may represent a minimum unit (e.g., a number of bytes) by which information can be allocated to the memory. For example, a memory may require that information be stored in increments that are two bytes long in order to optimize memory access for a CPU.

In FIG. 10, data-1 1020 may be a character that is 1-byte in length. Therefore, 1-byte of packing may be needed so that the amount of memory allocated to data-1 1020 is two bytes. Data-2 1040 may be a short and may require two bytes of memory. Since data-2 1040 is a multiple of two-bytes, data-2 1040 does not require any packing. Data-3 1050 may be an int that requires 4-bytes of memory. Since data-3 1050 is a multiple of two bytes, data-3 1050 does not require any packing. Data-4 1060 may be a character that is 4-bytes in length. Since data-4 1050 is a multiple of two bytes, data-4 1050 does not require any packing.

Embodiments of memory map 1010 may allow a user to interact with packing 1030 so that the user can determine a size of packing 1030 and/or an address of packing 1030 in memory. The user may further be able to store other types of information in the memory locations used for packing 1030. For example, a user may wish to store a 1-byte flag in a memory used to store data-1 1020, data-2 1040, data-3 1050, and data-4 1060. The user may drag a model element representing the flag from a graphical model and into memory map 1010. The user may drop the flag at a desired location, such as a location corresponding to packing 1030. Memory map 1010 may dynamically update to show that data for the flag is stored in the 1-byte region that was previously used for packing 1030. The model containing the flag element may also be updated to enable the model to interact with the memory locations storing the flag when the model executes.

Embodiments of MVA 130 may allow a user to drag elements from a model, e.g., a graphical model, onto a memory map. MVA 130 may further allow the user to drop a model element at a determined location in the memory map so that information related to the model element is stored in the determined memory location.

Figure 11A:
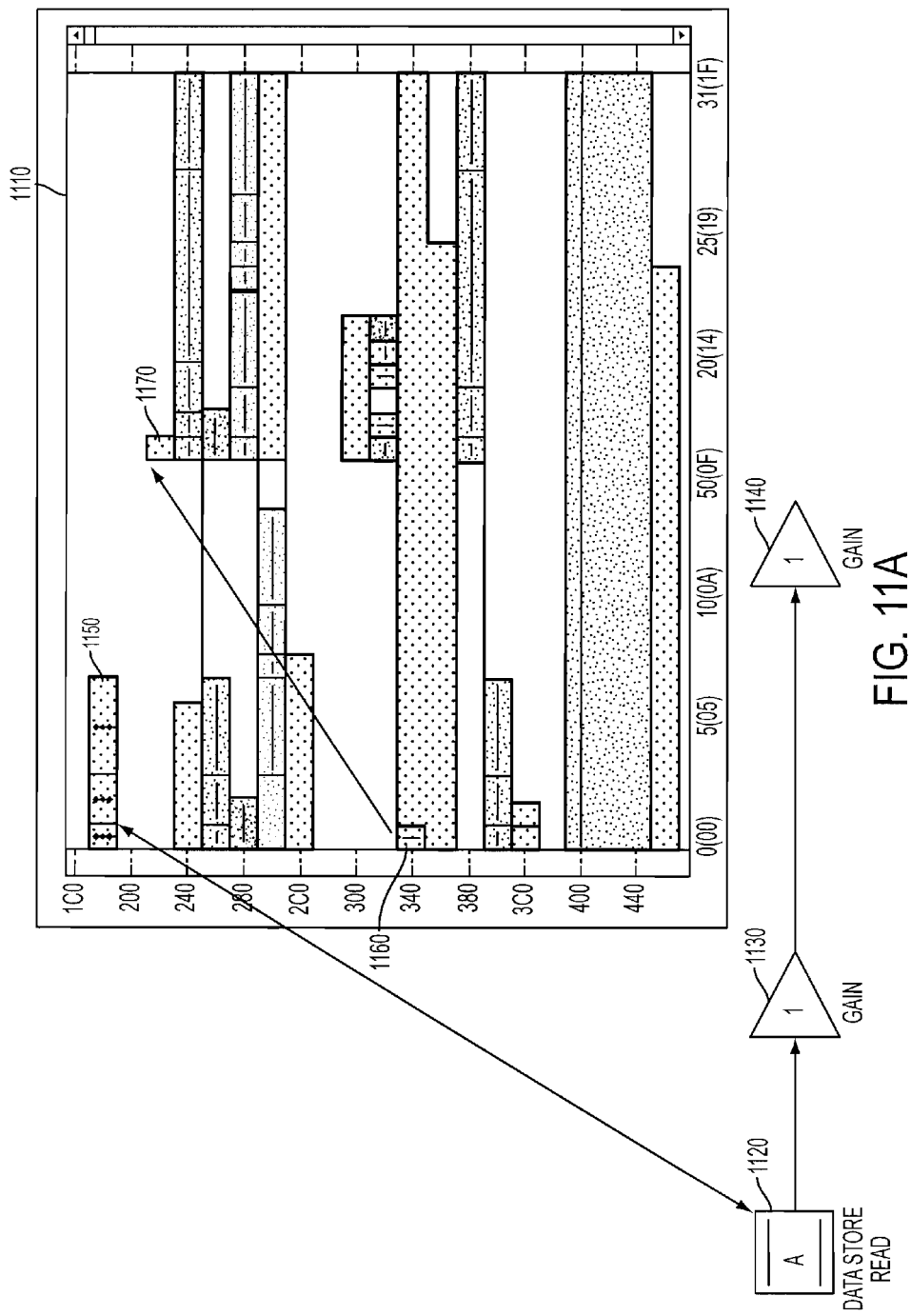
FIG. 11A illustrates an exemplary interactive memory map that can be used to allocate memory segments to model elements.

Referring to FIG. 11A, a user may interact with a graphical model that includes data store read (DSR) block 1120 and gain blocks 1130 and 1140. The user may wish to allocate storage for DSR block 1120 in a memory. The user may initiate MVA 130 and memory map 1110 may be displayed via GUI 170. Memory map 1110 may display a memory region along with graphical representations that indicate which memory locations are in use. The graphical representations may also indicate the types and/or sizes of information that are stored in memory (e.g., which bits of a fixed-point data type are used for representing the slope and which bits for representing the bias). The graphical representation may also, for example, represent information in formats, such as binary or other types of representations without departing from the spirit of the invention. The user may select DSR block 1120 using a pointing device and may drag a representation of DSR block 1120 over memory map 1110. The user can position the representation of DSR block 1120 over a location in memory map 1110 and may release the representation at the location. Memory map 1110 may be updated to show a graphical representation for storage used by DSR block 1120. For example, representation 1150 may be displayed in memory map 1110 to indicate an amount of memory used by DSR block 1120 and/or to identify memory locations used by DSR block 1120.

Embodiments of memory map 1110 may further allow a user to move stored information from one location in memory map 1110 to another location. For example, a user may select representation 1160 using a pointing device and may drag representation 1160 to a new location. The user may release representation 1160 at the new location and memory map 1110 may be updated to show the representation at the new location (shown as representation 1170 in FIG. 11).

In an embodiment, memory map 1110 may include different types of memory, such as flash and RAM. A user interacting with memory map 1110 may move a representation from one type of memory to another type of memory using a pointing device. For example, representation 1160 may be stored in flash and the representation may be stored in RAM when the representation is at the position identified as 1170.

Memory map 1110 may also be configured to represent memory types based on characteristics, such as power consumption, speed, area, etc. Information stored in a memory having a certain characteristic may be displayed using a first technique (e.g., color) and information stored in another memory having a different characteristic may be displayed using a different technique. Users may be able to move information to/from memories to obtain a desired outcome, such as having all information stored in memory while not exceeding a certain power budged for a device that includes the memory.

An embodiment of memory map 1110 may allow a user to drag a segment of memory from memory map 1110 into a model canvas to create a block in the model canvas. The block may interact with the corresponding memory segment when a model that includes the block is executed. The user may interact with the block to configure the block for a particular application. For example, a user may enter a name for the block, may specify input/output parameters for the block, a sample rate for the block, etc.

Figure 11B:
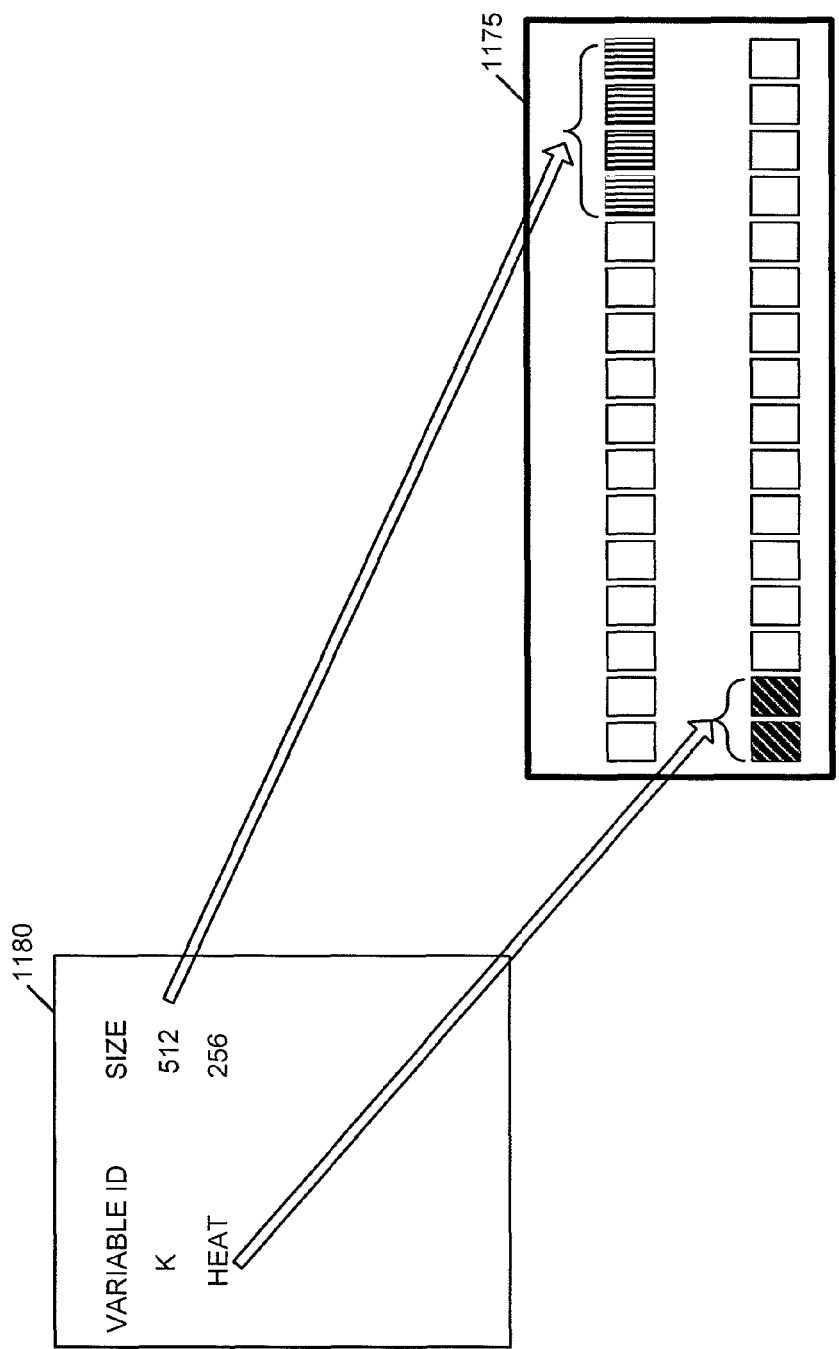
FIG. 11B illustrates an exemplary interactive memory map that can be used to allocate memory segments to variables in a workspace.

FIG. 11B illustrates a workspace storing textual representations for variables. An embodiment of memory map 1175 may allow a user to move information from workspace 1180 into memory map 1175 to allocate storage for the moved information. For example, a user may select a variable name or other information for the variable, e.g., size, format, etc., and may drag the selected information from workspace 1180 onto memory map 1175. When the user places the selected information on memory map 1175, storage may be allocated. In FIG. 11B, the user selected the size for variable K and moved that onto memory map 1175. Storage for variable K is indicated by graphical representations that include a vertical line pattern as fill. The user also selected the variable name HEAT and moved the selected name onto memory map 1175. Storage for HEAT was allocated to locations identified with diagonal line fill.

Figure 12:
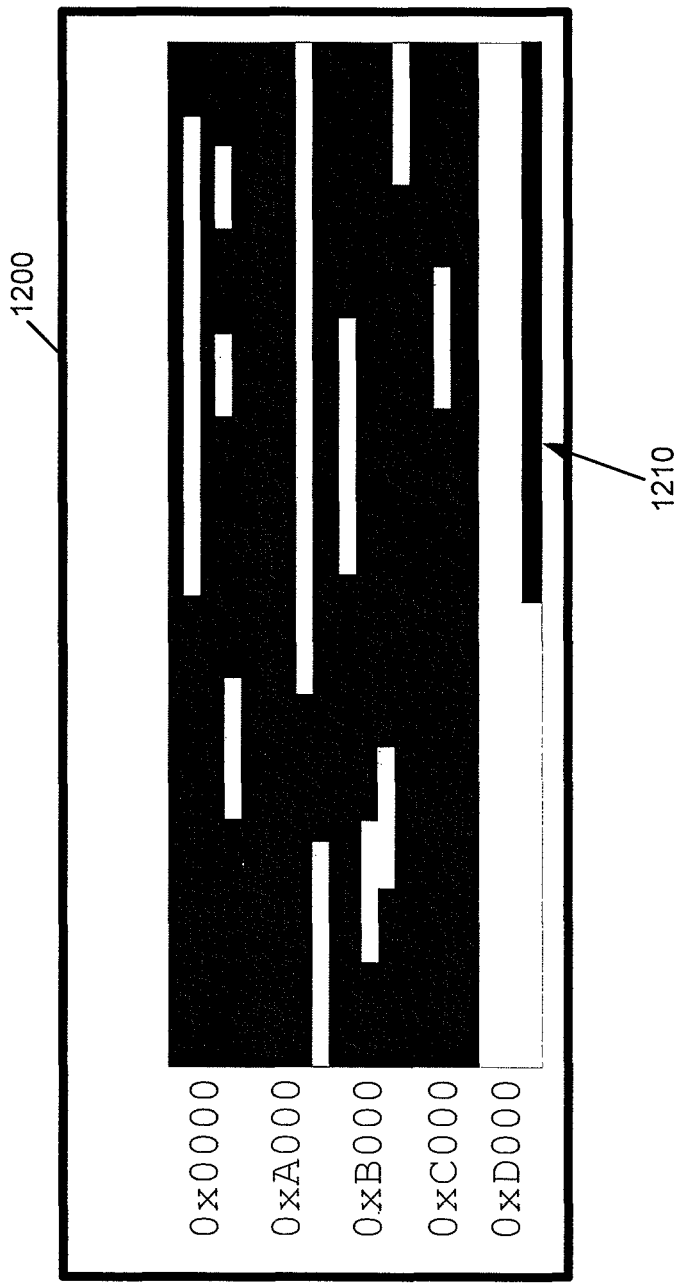
FIG. 12 illustrates an exemplary interactive memory map that can include a high-watermark for indicating an amount of memory used by an application.

Embodiments of memory maps can be configured to monitor worst case memory usage to aid users in sizing memory for applications. For example, and referring to FIG. 12, memory map 1200 may include a high-watermark 1210 that indicates a worst case memory usage at a point in time. For example, a program may execute and high-watermark 1210 may be at a first location in memory map 1200. As the program continues to execute, memory map 1200 may dynamically update to show changes in memory usage by the program. High-watermark 1210 may move to a second location when the program uses additional memory as compared to an amount of memory that was in use when high-watermark 1210 was at the first location. Embodiments of memory map 1200 can be configured to include additional identifiers, such as an identifier for average memory usage, minimum memory usage, etc., if desired.

Conventional memory management techniques may include the use of linker command files for indicating where memory sections are located on a device, such as a target device. Users may find it difficult to work with linker files as it may be hard for the user to relate textual address representations to an overall memory layout. In contrast to conventional techniques, interactive memory maps may provide the user with an intuitive graphical representation of a memory layout that can be related to text in the linker command file to provide the user with an overall understanding of how a memory will be configured and/or used by an application.

Figure 13:
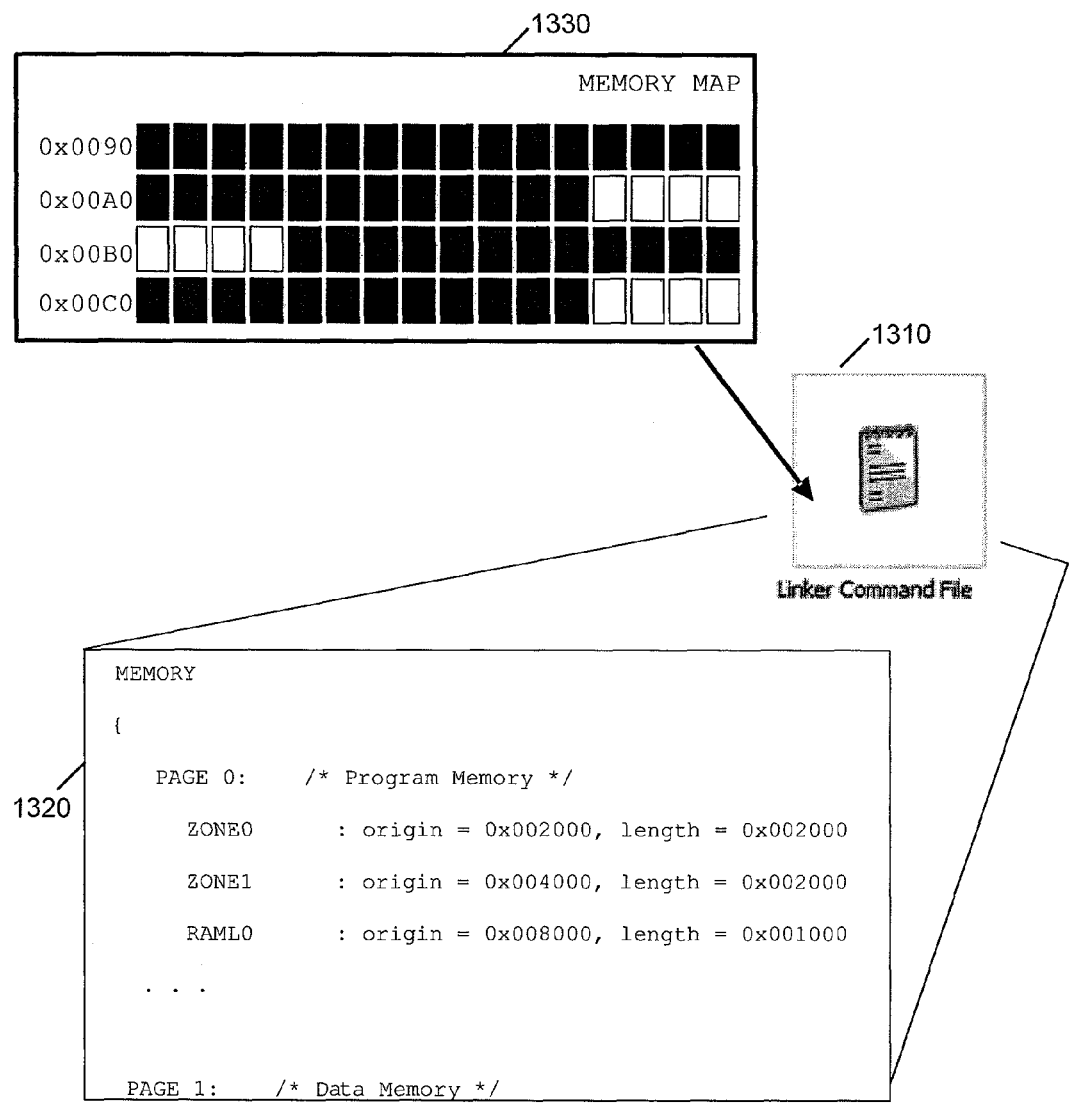
FIG. 13 illustrates an exemplary interactive memory map that can be used to graphically design memory locations for an application.

FIG. 13 illustrates an exemplary interactive memory map that can be used to graphically design memory locations for an application. A user may have a linker command file that is represented on a user interface via an icon 1310. The user may double click on icon 1310 to open a text-based linker command file 1320. The user may further open memory map 1330, which includes a graphical representation of a memory region used to store information in memory locations identified in linker command file 1320. The user may modify entries in linker command file 1320 and the changes will be reflected in memory map 1330. Conversely, the user can modify memory map 1330 and the changes can be reflected in linker command file 1320. In an embodiment, memory map 1330 can be serialized as 1320 to allow a linker to create and use appropriate sections of memory.

Figure 14:
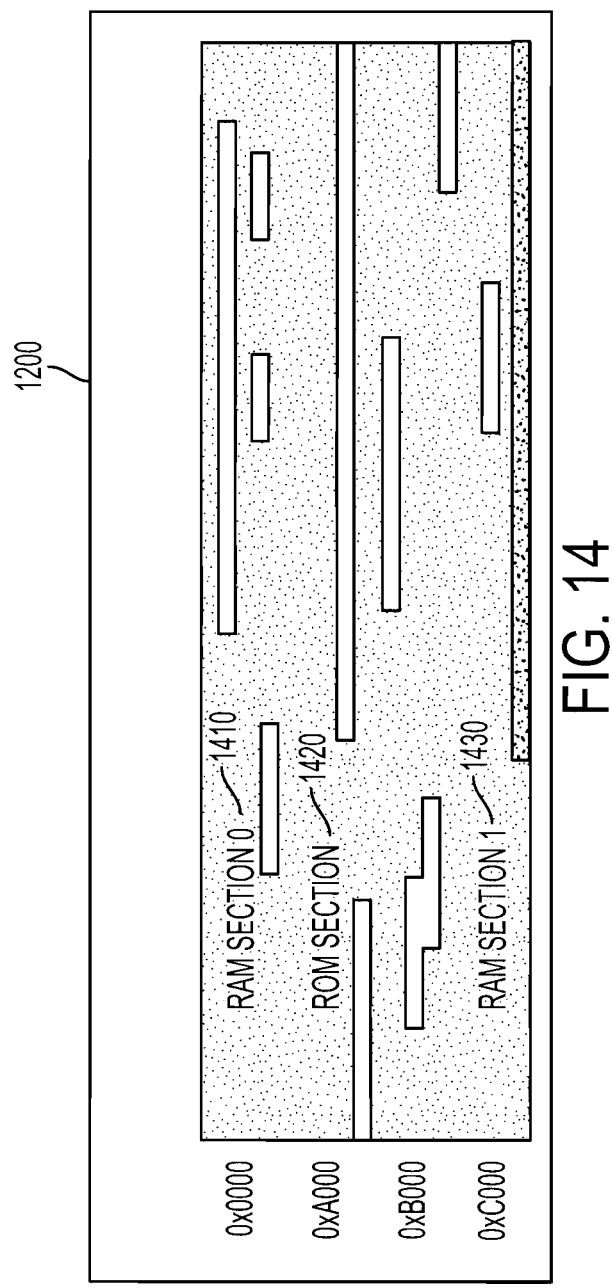
FIG. 14 illustrates an exemplary interactive memory map that can indicate types of information stored in a memory and where in the memory the information is stored.

Embodiments of memory maps can include information that identifies memory types used to store information for an application. For example, and referring to FIG. 14, memory map 1200 can be augmented to include identifier 1410 that identifies a portion of memory as being RAM section 0. Memory map 1200 may further include a second identifier 1420 that identifies another portion of memory as being a ROM section. In addition, memory map 1200 can include a third identifier 1430 that identifies a third portion of memory as being RAM section 1. Embodiments of memory maps can include identifiers for local memory on computer 110 and/or for remote memory without departing from the spirit of the invention.

Exemplary Processing

Figure 15:
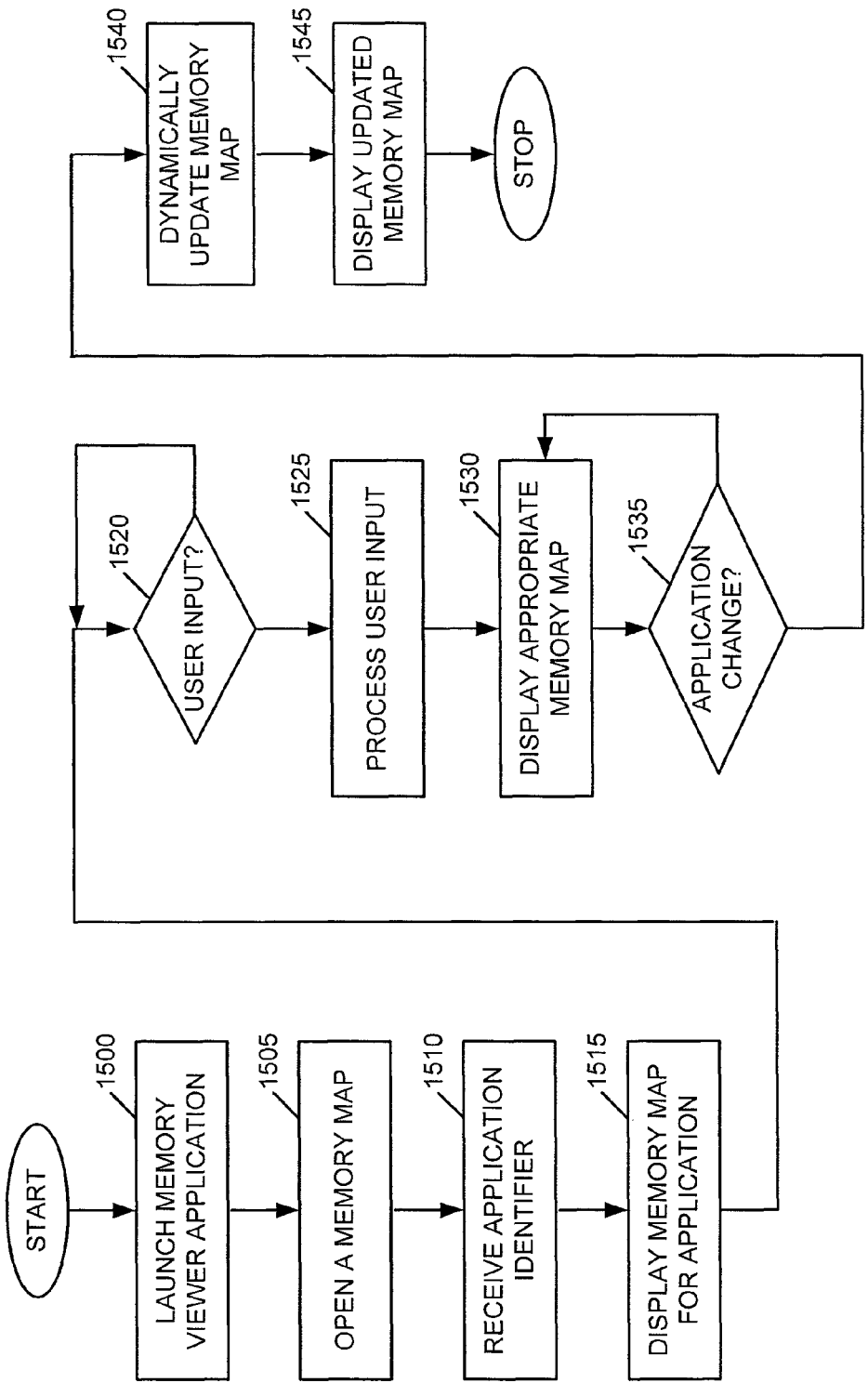
FIG. 15 illustrates exemplary processing that can be used to practice an embodiment of the invention.

FIG. 15 illustrates exemplary processing that can be used to practice an embodiment of the invention. A user of computer 110 may launch MVA 130 (act 1500). A memory map may be opened when MVA 130 executes (act 1505). For example, a blank memory map may be displayed to a user via GUI 170. A user may wish to view a portion of memory used by a program as the program executes. Computer 110 may receive an application identifier from the user, where the application identifier determines a textual or graphical program for which memory usage information will be displayed (act 1510).

A memory map for the application may be displayed in GUI 170 (act 1515). For example, an initial memory map may be displayed to the user. MVA 130 may determine whether a user input has been received (act 1520). For example, MVA 130 may poll to determine whether a user has indicated that read/write information for an executing model should be displayed (e.g., as in FIG. 5), whether a region of memory should be selected and shown in an expanded (zoom) view (e.g., as in FIG. 6), whether task timing information and corresponding memory locations should be displayed (e.g., as in FIG. 7), whether unused segments of memory should be removed to provide contiguous storage locations for data (e.g., as in FIGS. 9A and 9B), whether data packing information should be shown or manipulated (e.g., as in FIG. 10), whether a storage location should be provided for a model element (e.g., as in FIG. 11), whether a high-watermarking feature should be turned on in a memory map (e.g., as in FIG. 12), whether contents of a linker command file should be graphically displayed (e.g., as in FIG. 13), etc.

When a user input is received, the user input is processed (act 1525). For example, GUI 170 may be updated to display a memory map that includes information specified by the user (act 1530). When no user input is received at act 1520, MVA 130 may continue to monitor for a user input.

MVA 130 may monitor an application for which memory usage information is displayed in GUI 170 (act 1535). When memory usage changes for the application, MVA 130 dynamically updates a memory map displayed GUI 170 to reflect current memory usage (act 1540). MVA 130 may dynamically update information displayed in GUI 170 as long as a monitored application continues to execute. Updated memory maps may be displayed to the user as the application executes (act 1545). Embodiments may also allow memory maps to be archived, printed, transmitted to a destination via a network, etc.

Exemplary Distributed Embodiment

Distributed implementations may distribute processing across two or more cores in a single processing device, distribute processing across multiple processing devices installed within a single enclosure, and/or distribute processing across multiple types of processing logic connected by a network.

Figure 16:
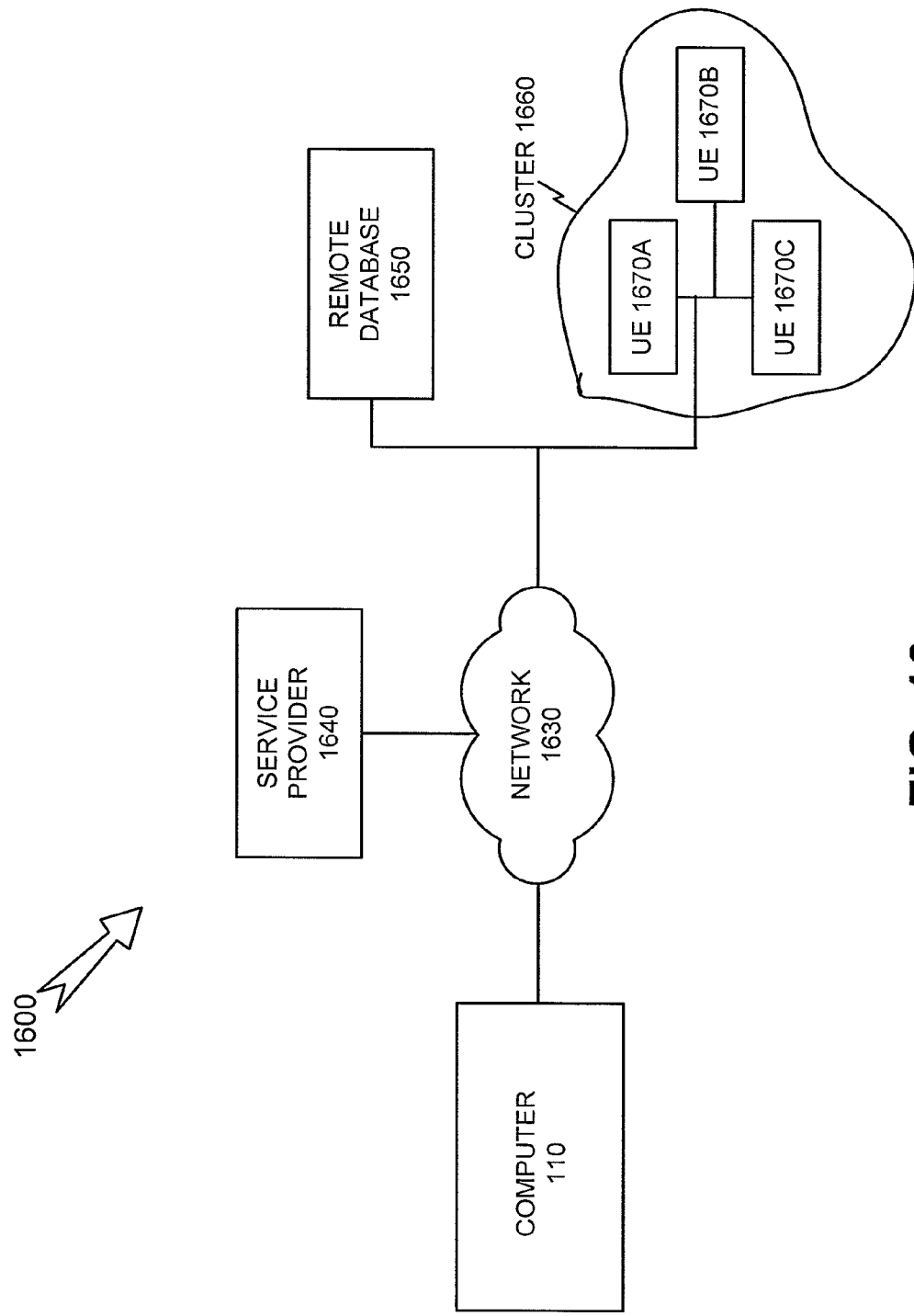
FIG. 16 illustrates an exemplary distributed embodiment of the invention.

FIG. 16 illustrates an exemplary system that can implement dynamically updated interactive memory maps using a distributed computing environment. System 1600 may include computer 110, network 1630, service provider 1640, remote database 1650 and cluster 1660. The implementation of FIG. 16 is exemplary and other distributed implementations of the invention may include more devices and/or components, fewer devices and/or components, and/or devices/components in configurations that differ from the exemplary configuration of FIG. 16.

Computer 110 may include GUI 170 for displaying memory maps and for allowing a user to interact with computer 110 and/or remote devices (e.g., service provider 1640). In an exemplary embodiment, GUI 170 may be similar to the interfaces of FIGS. 3-8, 9A-B, and 10-14.

Network 1630 may include any network capable of transferring data (e.g., packet data or non-packet data). Implementations of network 1630 may include local area networks (LANs), metropolitan area networks (MANs) and/or wide area networks (WANs), such as the Internet, that may operate using substantially any network protocol, such as Internet protocol (IP), asynchronous transfer mode (ATM), synchronous optical network (SONET), user datagram protocol (UDP), IEEE 802.10, etc.

Network 1630 may include network devices, such as routers, switches, firewalls, and/or servers (not shown). Network 1630 may be a hardwired network using wired conductors and/or optical fibers and/or may be a wireless network using free-space optical, radio frequency (RF), and/or acoustic transmission paths. In one implementation, network 1630 may be a substantially open public network, such as the Internet. In another implementation, network 1630 may be a more restricted network, such as a corporate virtual network. Implementations of networks and/or devices operating on networks described herein are not limited to any particular data type, protocol, architecture/configuration, etc. For example, in one embodiment, network 1630 may be a quantum network that uses quantum-compatible networking protocols.

Service provider 1640 may include a device that makes a service available to another device. For example, service provider 1640 may include an entity that provides one or more services to a destination using a server and/or other devices. Services may include instructions that are executed by a destination to perform an operation. Alternatively, a service may include instructions that are executed on behalf of a destination to perform an operation on the destination's behalf.

Assume, for sake of example, that a service provider operates a web server that provides one or more web-based services to a destination, such as computer 110. The web-based services may allow computer 110 to perform distributed processing for supporting the use of memory maps with executing applications. The web-based services may also allow computer 110 to view interactive memory maps during the simulation. In one implementation, a customer (user) may receive services on a subscription basis.

A subscription may include substantially any type of arrangement, such as monthly subscription, a per-use fee, a fee based on an amount of information exchanged between service provider 1640 and the customer, a fee based on a number of processor cycles used by the customer, a fee based on a number of processors used by the customer, etc. For example, a user may be using a memory map to view how memory is accessed by an executing model. The user may determine that a device on which the model executes has insufficient memory to support the model. Service provider 1640 may include an application that automatically initiates a purchase order for additional memory, where the additional memory is compatible with the device and executing model. Alternatively, service provider 1640 may generate a report that details the shortcomings of memory installed in the device may trigger an event that alerts a user to the fact that there is not enough memory in the device to execute the model, etc.

Remote database 1650 may include a device that stores machine-readable information for use by other devices, such as computer 110. In one embodiment, remote database 1650 may include an array or grid of storage devices (e.g., hard disks, optical disks, solid-state storage devices, etc.) that store information about variable size/dimension signals, models used to process variable size/dimension signals, data produced by models, etc.

Cluster 1660 may include a group of processing devices, such as units of execution 1670A, B, and C, that can be used to perform remote processing (e.g., distributed processing, parallel processing, etc.). Units of execution 1670 may include hardware and/or hardware/software based devices that perform processing operations on behalf of a requesting device, such as computer 110.

In an embodiment, units of execution 1670A, B, and C may each compute a partial coverage result for a static or variable sized signal and these partial coverage results can be combined into an overall coverage result for a model. For example, a user may want to determine whether all available memory is used by an application. The user may have units of execution 1670A, B and C each perform coverage analysis for a portion of the memory and the results of these analyses may be combined into a single coverage result for the entire memory.

Embodiments operating in a standalone or in a distributed implementation can interact with storage used to support text-based computing and/or modeling applications, such as, but not limited to, MATLAB® by The MathWorks, Inc.; Octave; Python; Comsol Script; MATRIXx from National Instruments; Mathematica from Wolfram Research, Inc.;

Mathcad from Mathsoft Engineering & Education Inc.; Maple from Maplesoft; Extend from Imagine That Inc.; Scilab from The French Institution for Research in Computer Science and Control (INRIA); Virtuoso from Cadence; or Modelica or Dymola from Dynasim.

Embodiments can further interact with storage that support graphical modeling environments, such as, but not limited to, Simulink®, Stateflow®, SimEvents™, etc., by The MathWorks, Inc.; VisSim by Visual Solutions; LabView® by National Instruments; Dymola by Dynasim; SoftWIRE by Measurement Computing; WiT by DALSA Coreco; VEE Pro or SystemVue by Agilent; Vision Program Manager from PPT Vision; Khoros from Khoral Research; Gedae by Gedae, Inc.; Scicos from (INRIA); Virtuoso from Cadence; Rational Rose from IBM; Rhopsody or Tau from Telelogic; Ptolemy from the University of California at Berkeley; ASCET, CoWare, aspects of a Unified Modeling Language (UML) or SysML environment, AADL and MARTE, or Green Hills (GHS) Event Analyzer™, Exemplary Implementations An exemplary embodiment can include one or more computer-readable media that store executable instructions for mapping memory locations when the instructions are executing on processing logic. The media can include instructions for identifying a memory layout that indicates memory locations for storing program information. In the embodiment, the program information can be used with an executable model while the model executes. The media can also include instructions for receiving first data that identifies a first segment of program information, where the first segment of program information is written to a first one of the memory locations. The media can also include instructions for outputting a representation of the memory layout. For example, the representation may be a graphical representation (e.g., 2D, 3D, etc.) and can include a first segment identifier that identifies the first segment when the first segment is written to the first one of the memory locations.

The media of the exemplary embodiment can further include instructions for receiving second data that identifies the first segment of program information when the first segment of program information is read from the first one of the memory locations. Or, the second data can include instructions for a second segment of program information, where the second segment of program information is written to a second one of the locations, or is read from the second one of the locations. The media can further include instructions for updating the representation of the memory layout with a second segment identifier. The second segment identifier can identify the first segment of program information when the first segment of program information is read from the first one of the locations, or the second segment identifier can identify the second segment of program information when the second segment of program information is written to a second one of the locations, or is read from the second one of the locations.

The exemplary embodiment can be configured to output representations of the memory layout and/or to update the representation of the memory layout while the model executes to provide a user of the model with substantially real-time information about memory interactions between the model and a memory. Segments of program information in the exemplary embodiment can represent signals, variables, etc., without departing from the spirit of the invention. Memory locations displayed in the memory layout may be local memory locations on a computer executing the model, on a target device hosting a target environment, or the memory locations may be remote with respect to the computer or the target device. In addition, the memory map can display information about a single memory, a distributed memory, dedicated memory, a shared memory, etc.

An exemplary embodiment can include one or more computer-readable media storing one or more executable instructions that output memory usage information for a program when the instructions are executed on processing logic. The instructions can output a memory layout that identifies memory that is used by the program when the program executes. The outputted memory layout can included a first identifier that indicates an amount of memory and a memory location for a first element in the program. The media can also include instructions for receiving a user input in response to a user action. The instruction can be received on behalf of a second element in the program and may indicate a second location in the memory layout, where the second location stores information on behalf of the second element. In the embodiment, a user may indicate the second location using a pointing device. An updated memory layout may be outputted and may include the first identifier that indicates the amount of memory and the memory location for the first element. The updated memory layout can also include a second identifier that indicates an amount of memory for the second element and the second location.

If desired, the embodiment can output the memory layout or the updated memory layout that includes displayed information for identifying data structure padding, memory fragmentation, or memory segmentation. The embodiment can also be configured to remap the memory layout or the updated memory layout. Here the remapping may operate to modify memory usage, e.g., memory usage after the remapping may differ from memory usage prior to the remapping. The embodiment can also be configured to track memory usage history. For example, a displayed memory map may include information that identifies how the first element or the second element has used memory over a given time interval. The embodiment can further be configured to provide a user with an error when the first element or the second element will not be stored in a determined portion of memory.

An exemplary embodiment can include a computer implemented method for debugging executable code. The method can include outputting a memory layout that identifies memory used by the executable code. For example, the embodiment can display a memory map showing memory available to the executable code. The method may execute a first instruction of the executable code using a debugger, such as a debugger operated by a user. The method may also update the memory layout to indicate a first memory location used by the first instruction. For example, the memory map may update and may display a color (e.g., green) to indicate memory segments where the first instruction is stored in memory.

The method may step to a second instruction of the executable code using the debugger and may execute the second instruction. The method may update the memory layout to identify a second memory location used by the second instruction. For example, the method can identify the second memory location using an identification technique that differs from a technique used to identify the first memory location (e.g., the second memory location may be identified using the color red when the second instruction is executing). Alternatively, the method may identify the second memory location using a font, size, effect, or icon that differs from a font, size, effect, or icon that represents or indicates the first memory location.

In the exemplary embodiment, the method can use the memory layout to monitor and/or identify stack overruns, priority conflicts, priority inversions, etc. The exemplary embodiment can also configure the method to identify that the first memory location or the second memory location should be moved from a current location in the memory layout to a new location in the memory layout. And, the method can be configured to identify that the first memory location or the second memory location should be resized. The embodiment can further use the disclosed method to interact with a common memory shared by two or more processing devices, interact with two or more memories used by a single processing device, interact with two or more memories used by multiple processing devices, etc., without departing from the spirit of the invention.

An exemplary embodiment may include a system for interacting with a memory layout. For example, the system may interact with a memory layout that provides a user with substantially real-time information about how an executing program interacts with memory. The embodiment can be configured to operate with text programs and/or graphical-based programs. The embodiment can include a display device that displays a memory layout used with executable code. In the embodiment, the memory layout can represent memory locations that the executable code interacts with while the code is executing. The display device may also display graphical or textual representations of executable code that stores information in one or more of the memory locations. For example, a block in an executable block diagram may be displayed in one portion of the display and a memory layout that includes storage used by the block may be displayed in another portion of the display.

The embodiment may also include processing logic to process a first instruction. The processing logic may also send a first identifier to the display device, where the first identifier identifies a first memory location in the memory layout. The processing logic may further process a second instruction and may send a second identifier to the display device, where the second identifier identifies a second memory location in the memory layout. In the embodiment, the second memory location may be used by the second instruction and the display may display the second identifier when the memory layout is updated with the second identifier.

Embodiments may be configured to work with legacy code (e.g., handwritten code) and/or generated code. The embodiments can display memory that stores legacy code in a first manner and memory that stores generated code in a second manner. Embodiments may further be configured to work with storage classes that can be entities having parameters that specify how a variable should be stored. Embodiments use memory maps to display a storage class of a first type using a first display technique and may display a second storage class using a second display technique.

Embodiments may use instruction set simulators and/or other techniques/devices for determining memory layout and usage for a particular application or device. The instruction set simulators may interact with a memory map viewing application to display one or more memories associated with the instruction set simulator.

Memory map viewers may also be used to identify potential security violations. For example, non-malicious applications may attempt to interact with certain portions of a memory displayed via a memory map. In contrast, a malicious application may attempt to access a different portion of memory, where the different portion is off limits to non-malicious applications. The memory map may display the off limits memory locations and may visually indicate to a user when the off limits memory locations are written to or read from. The embodiment may further use marking techniques, such as a watermark, to indicate when a malicious application attempted to access an off limits portion of memory.

An embodiment of a memory map may be used to indicate how information in memory is transmitted to a destination or is received from a destination. For example, variables may be stored in memory. The variables may be retrieved from memory and placed into packets for transmission to the destination. A memory map may display the variables in memory, may indicate which variables are retrieved from memory, and may indicate which packet, or packets, the variables were placed into for transmission to the destination. The memory map may further display packet conflicts, e.g., when a packet is dropped in route, does not get transmitted, gets retransmitted, is returned as undeliverable, etc.

CONCLUSION

Implementations may provide interactive memory maps that allow a user to view and/or manipulate memory used by a textual or graphical program.

The foregoing description of exemplary embodiments of the invention provides illustration and description, but is not intended to be exhaustive or to limit the invention to the precise form disclosed. Modifications and variations are possible in light of the above teachings or may be acquired from practice of the invention. For example, while a series of acts has been described with regard to FIG. 15, the order of the acts may be modified in other implementations consistent with the principles of the invention. Further, non-dependent acts may be performed in parallel.

In addition, implementations consistent with principles of the invention can be implemented using devices and configurations other than those illustrated in the figures and described in the specification without departing from the spirit of the invention. Devices and/or components may be added and/or removed from the implementations of FIG. 1, 2, or 16 depending on specific deployments and/or applications. Further, disclosed implementations may not be limited to any specific combination of hardware.

Further, certain portions of the invention may be implemented as "logic" that performs one or more functions. This logic may include hardware, such as hardwired logic, an application-specific integrated circuit, a field programmable gate array, a microprocessor, software, or a combination of hardware and software.

No element, act, or instruction used in the description of the invention should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

Headings and sub-headings used herein are to aid the reader by dividing the specification into subsections. These headings and sub-headings are not to be construed as limiting the scope of the invention or as defining the invention.

The scope of the invention is defined by the claims and their equivalents.

What is claimed is:

1. A non-transitory computer-readable medium storing instructions, the instructions comprising:
    a plurality of instructions which, when executed by one or more computing devices, cause the one or more computing devices to:

identify a memory layout,
    the memory layout indicating memory locations for storing program information, and
    the program information being used with an executable model;
receive first data identifying a first segment of program information being written to a first location of the memory locations;
output the memory layout,
    the memory layout including, based on receiving the first data, a first segment identifier that identifies the first segment of the program information being written to the first location of the memory locations;
receive second data identifying the first segment of the program information being read from the first location of the memory locations;
receive particular information regarding user action,
    the user action including a selection of a representation of a block, of the executable model, and a movement of the representation of the block to a location of the memory layout that corresponds to a second location of the memory locations, and
    a second segment of the program information corresponding to the block and being written to the second location of the memory locations based on the particular information;
update the memory layout, based on receiving the second data and the particular information, to further include:
    a second segment identifier that identifies the first segment of the program information being read from the first location of the memory locations, and
    a third segment identifier that identifies the second segment of the program information being written to the second location of the memory locations; and
    output the updated memory layout.

2. The non-transitory computer-readable medium of claim 1, where the memory layout is output and updated during execution of the executable model.

3. The non-transitory computer-readable medium of claim 1, where the first segment of program information or the second segment of program information represents a variable used in the executable model.

4. The non-transitory computer-readable medium of claim 1, where the memory locations are physical memory locations.

5. The non-transitory computer-readable medium of claim 1, where the memory locations are shared memory locations used by two or more processors performing distributed computing operations.

6. A non-transitory computer-readable medium storing instructions, the instructions comprising:
a plurality of instructions which, when executed by one or more computing devices, cause the one or more computing devices to:
    output a memory layout that identifies memory used by a program while the program executes,
        the memory layout including a first identifier indicating:
            an amount of memory, and
            a first memory location for storing information relating to a first element in the program;
    detect a user action, on the memory layout, relating to a second element in the program,
        the user action corresponding to an action of selecting a representation of the second element and moving the representation of the second element to a second memory location in the memory layout, and
        the user action indicating that the second memory location is to store information relating to the second element;
    determine an amount of memory for the second element based on detecting the user action;
    update the memory layout to obtain an updated memory layout that includes:
        the first identifier, and
        a second identifier,
            the second identifier indicating:
                the amount of memory for the second element, and
                the second memory location; and
    output the updated memory layout.

7. The non-transitory computer-readable medium of claim 6, where the memory layout or the updated memory layout includes a high-watermark that indicates an amount of memory used by the program.

8. The non-transitory computer-readable medium of claim 6, where the instructions further comprise:
    one or more instructions which, when executed by the one or more computing devices, cause the one or more computing devices to zoom into the memory layout or the updated memory layout based on an input, or
    one or more instructions which, when executed by the one or more computing devices, cause the one or more computing devices to zoom out of the memory layout or the updated memory layout based on the input.

9. The non-transitory computer-readable medium of claim 6, where one or more instructions, of the plurality of instructions, to output the memory layout or the updated memory layout include:
    one or more instructions which, when executed by the one or more computing devices, cause the one or more computing devices to display information identifying data structure padding, memory fragmentation, or memory segmentation.

10. The non-transitory computer-readable medium of claim 6, where the instructions further comprise:
    one or more instructions which, when executed by the one or more computing devices, cause the one or more computing devices to remap the memory layout or the updated memory layout to modify memory usage with respect to memory usage associated with the program prior to the remapping.

11. The non-transitory computer-readable medium of claim 6, where one or more instructions, of the plurality of instructions, to output the updated memory layout include:
    one or more instructions which, when executed by the one or more computing devices, cause the one or more computing devices to output a history of memory usage for the first element or the second element.

12. The non-transitory computer-readable medium of claim 6, where the instructions further comprise:
    one or more instructions which, when executed by the one or more computing devices, cause the one or more computing devices to remap the memory layout or the updated memory layout to reduce memory usage associated with the program.

13. The non-transitory computer-readable medium of claim 6, where one or more instructions, of the plurality of instructions, to output the memory layout or the updated memory layout include:
    one or more instructions which, when executed by the one or more computing devices, cause the one or more computing devices to indicate that the first element or the second element will not be stored within a determined portion of the memory.

14. A method comprising:

outputting a memory layout that identifies memory used by executable code,
 outputting the memory layout being performed by a computing device,
 the memory layout indicating that first information has been written to or has been read from a first memory location of the memory, and
 the first information being associated with a first element of a model;
identifying a selection, by a user, of a representation of a second element of the model,
 identifying the selection of the representation of the second element being performed by the computing device;
identifying a movement, by the user, of the representation of the second element to a location of the memory layout that corresponds to a second memory location of the memory,
 identifying the movement of the representation of the second element being performed by the computing device;
updating the memory layout based on the selection of the representation of the second element and the movement of the representation of the second element to the location of the memory layout that corresponds to the second memory location,
 updating the memory layout being performed by the computing device,
 the updated memory layout indicating that second information has been written to the second memory location, and
 the second information being associated with a second element of the model; and
outputting the updated memory layout,
 outputting the updated memory layout being performed by the computing device.

15. The method of claim 14, further comprising:
monitoring stack overruns, priority conflicts, or priority inversions using the updated memory layout.

16. The method of claim 14, further comprising:
providing runtime visualization for the executable code based on the updated memory layout.

17. The method of claim 14, where the executable code is represented by the first element and the second element in the model.

18. The method of claim 14, where the second memory location is identified using a color, a font, a size, an effect, or an icon that differs from a color, a font, a size, an effect, or an icon that is used to identify the first memory location.

19. The method of claim 14, further comprising:
receiving a particular instruction from the user,
 the particular instruction being based on an action of the user,
  the action including a selection of a representation of the first element and a movement of the representation to a different location of the updated memory layout that corresponds to a third memory location of the memory; and
moving the first information to the third memory location based on receiving the particular instruction.

20. The method of claim 14, further comprising:
receiving a particular instruction, from the user, indicating that the first memory location or the second memory location is to be resized; and
resizing the first memory location or the second memory location based on receiving the particular instruction.

21. The method of claim 14,
where the first memory location is associated with a first processor, and
where the second memory location is associated with a second processor.

22. The method of claim 21, where the first processor and the second processor perform computing operations concurrently.

23. The method of claim 14, where the memory is shared between a first processor and a second processor.

24. The method of claim 14, where the memory includes one or more of:
a cache,
a stack,
a heap,
a register, or
a queue.

25. The method of claim 14, further comprising:
flagging data integrity issues associated with the first information or the second information by using the updated memory layout.

26. The method of claim 14, further comprising:
identifying out of sequence data stored in the memory using the updated memory layout, or
identifying memory transactions stored in the memory using the updated memory layout.

27. The method of claim 14,
where the first information includes information regarding a first instruction that executes on a first thread, and
where the second information includes information regarding a second instruction that executes on a second thread.

28. The method of claim 27,
where the first thread executes on a first core, and
where the second thread executes on a second core.

29. A system comprising:
a processor to:
 provide, for display, a memory layout associated with executable code,
  the memory layout representing memory locations,
 cause the memory layout to include a first identifier,
  the first identifier indicating that first information is stored in a first memory location of the memory locations, and
  the first information being associated with a first element of a model,
 identify a selection, by a user, of a representation of a second element of the model,
 identify a movement, by the user, of the representation of the second element to a location of the memory layout that corresponds to a second memory location of the memory locations,
 cause the memory layout to include, based on the selection of the representation and the movement of the representation, a second identifier,
  the second identifier indicating that second information is stored in the second memory location of the memory locations, and
  the second information being associated with the second element, provide, for display, the first identifier and the second identifier.

30. The system of claim 29,
where the first identifier and the second identifier are included in the memory layout while the model is executing.

31. The system of claim 29,
where the first information includes information regarding a first instruction that is executed on a first processor,
where the second information includes information regarding a second instruction that is executed on a second processor, and
where the first processor and the second processor operate concurrently.

\* \* \* \* \*